United States Patent
Jang

(10) Patent No.: US 11,901,562 B2
(45) Date of Patent: Feb. 13, 2024

(54) BIPOLAR ELECTRODES CONTAINING FLAME-RESISTANT QUASI-SOLID OR SOLID-STATE ELECTROLYTE, BIPOLAR LITHIUM BATTERIES, AND MANUFACTURING METHOD

(71) Applicant: Global Graphene Group, Inc., Dayton, OH (US)

(72) Inventor: Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 346 days.

(21) Appl. No.: 17/197,148

(22) Filed: Mar. 10, 2021

(65) Prior Publication Data

US 2022/0293958 A1 Sep. 15, 2022

(51) Int. Cl.
*H01M 10/00* (2006.01)
*H01M 4/66* (2006.01)
(Continued)

(52) U.S. Cl.
CPC ........... *H01M 4/663* (2013.01); *H01M 4/364* (2013.01); *H01M 4/382* (2013.01); *H01M 4/505* (2013.01);
(Continued)

(58) Field of Classification Search
CPC .. H01M 4/663; H01M 10/0525; H01M 4/364; H01M 10/0565; H01M 10/0567;
(Continued)

(56) References Cited

U.S. PATENT DOCUMENTS 2,798,878 A 7/1957 Hummers
5,532,077 A 7/1996 Chu
(Continued)

FOREIGN PATENT DOCUMENTS

CN 110808408 B 2/2021
CN 111933894 B 4/2022
(Continued)

OTHER PUBLICATIONS

Kimura, Lithium Ion Secondary Battery, Feb. 2021, See the Abstract. (Year: 2021).*
(Continued)

*Primary Examiner* — Cynthia H Kelly
*Assistant Examiner* — Monique M Wills

(57) ABSTRACT

A bipolar electrode for a lithium battery, the bipolar electrode comprising: (a) a current collector comprising a conductive material foil having two opposing primary surfaces, wherein one or both of the primary surfaces is optionally coated with a layer of graphene or expanded graphite material having a thickness from 5 nm to 50 μm; and (b) a negative electrode layer and a positive electrode layer respectively disposed on the two primary surfaces, wherein the positive electrode layer comprises a mixture of particles of a cathode active material and a quasi-solid or solid-state electrolyte and the electrolyte comprises a polymer, which is a polymerization or crosslinking product of a reactive additive, wherein the reactive additive comprises (i) a first liquid solvent that is polymerizable, (ii) an initiator or curing agent, and (iii) a lithium salt. Also provided is a bipolar battery comprising a plurality of bipolar electrodes connected in series.

32 Claims, 6 Drawing Sheets

(51) Int. Cl.
*H01M 10/0525* (2010.01)
*H01M 4/36* (2006.01)
*H01M 10/0565* (2010.01)
*H01M 10/0567* (2010.01)
*H01M 10/0569* (2010.01)
*H01M 4/505* (2010.01)
*H01M 4/525* (2010.01)
*H01M 4/38* (2006.01)
*H01M 4/02* (2006.01)

(52) U.S. Cl.
CPC ....... *H01M 4/525* (2013.01); *H01M 10/0525* (2013.01); *H01M 10/0565* (2013.01); *H01M 10/0567* (2013.01); *H01M 10/0569* (2013.01); *H01M 2004/027* (2013.01); *H01M 2004/028* (2013.01); *H01M 2004/029* (2013.01); *H01M 2300/0037* (2013.01)

(58) Field of Classification Search
CPC .. H01M 10/0569; H01M 4/382; H01M 4/505; H01M 4/525
See application file for complete search history.

(56) References Cited

U.S. PATENT DOCUMENTS

| | | | |
|---|---|---|---|
| 9,059,481 | B2 | 6/2015 | He et al. |
| 9,368,831 | B2 | 6/2016 | He et al. |
| 9,601,803 | B2 | 3/2017 | He et al. |
| 9,601,805 | B2 | 3/2017 | He et al. |
| 2018/0040900 | A1 | 2/2018 | Zhamu et al. |
| 2019/0058185 | A1 | 2/2019 | Lee et al. |
| 2020/0295383 | A1* | 9/2020 | Bistrika ................ C23C 18/168 |

FOREIGN PATENT DOCUMENTS

| | | | |
|---|---|---|---|
| JP | 2020068188 A | 4/2020 | |
| JP | 6826816 B2 * | 2/2021 | .......... H01M 10/052 |

OTHER PUBLICATIONS

International No. PCT/US2022/071061; International Search Report dated Jun. 29, 2022; 4 pages.

* cited by examiner

Discharged state (or as manufactured)

Charged state

BIPOLAR ELECTRODES CONTAINING FLAME-RESISTANT QUASI-SOLID OR SOLID-STATE ELECTROLYTE, BIPOLAR LITHIUM BATTERIES, AND MANUFACTURING METHOD

FIELD

The present invention provides bipolar electrodes containing a fire/flame-resistant electrolyte, a bipolar lithium battery containing multiple bipolar electrodes, and manufacturing methods for the bipolar electrode and the bipolar battery.

BACKGROUND

Rechargeable lithium-ion (Li-ion) and lithium metal batteries (e.g., lithium-sulfur, lithium selenium, and Li metal-air batteries) are considered promising power sources for electric vehicle (EV), hybrid electric vehicle (HEV), and portable electronic devices, such as lap-top computers and mobile phones. Lithium as a metal element has the highest lithium storage capacity (3,861 mAh/g) compared to any other metal or metal-intercalated compound as an anode active material (except $Li_{4.4}Si$, which has a specific capacity of 4,200 mAh/g). Hence, in general, Li metal batteries (having a lithium metal anode) have a significantly higher energy density than lithium-ion batteries (having a graphite anode).

However, the electrolytes used for lithium-ion batteries and all lithium metal secondary batteries pose some safety concerns. Most of the organic liquid electrolytes can cause thermal runaway or explosion problems.

Ionic liquids (ILs) are a new class of purely ionic, salt-like materials that are liquid at unusually low temperatures. The official definition of ILs uses the boiling point of water as a point of reference: "Ionic liquids are ionic compounds which are liquid below 100° C.". A particularly useful and scientifically interesting class of ILs is the room temperature ionic liquid (RTIL), which refers to the salts that are liquid at room temperature or below. RTILs are also referred to as organic liquid salts or organic molten salts. An accepted definition of an RTIL is any salt that has a melting temperature lower than ambient temperature.

Although ILs were suggested as a potential electrolyte for rechargeable lithium batteries due to their non-flammability, conventional ionic liquid compositions have not exhibited satisfactory performance when used as an electrolyte likely due to several inherent drawbacks: (a) ILs have relatively high viscosity at room or lower temperatures; thus being considered as not amenable to lithium ion transport; (b) For Li—S cell uses, ILs are capable of dissolving lithium polysulfides at the cathode and allowing the dissolved species to migrate to the anode (i.e., the shuttle effect remains severe); and (c) For lithium metal secondary cells, most of the ILs strongly react with lithium metal at the anode, continuing to consume Li and deplete the electrolyte itself during repeated charges and discharges. These factors lead to relatively poor specific capacity (particularly under high current or high charge/discharge rate conditions, hence lower power density), low specific energy density, rapid capacity decay and poor cycle life. Furthermore, ILs remain extremely expensive. Consequently, as of today, no commercially available lithium battery makes use of an ionic liquid as the primary electrolyte component.

Solid state electrolytes are commonly believed to be safe in terms of fire and explosion proof. Solid state electrolytes can be divided into organic, inorganic, organic-inorganic composite electrolytes. However, the conductivity of organic polymer solid state electrolytes, such as poly(ethylene oxide) (PEO), polypropylene oxide (PPO), poly(ethylene glycol) (PEG), and poly(acrylonitrile) (PAN), is typically low ($<10^{-5}$ S/cm).

Although the inorganic solid-state electrolyte (e.g., garnet-type and metal sulfide-type) can exhibit a high conductivity (about $10^{-3}$ S/cm), the interfacial impedance or resistance between the inorganic solid-state electrolyte and the electrode (cathode or anode) is high. Further, the traditional inorganic ceramic electrolyte is very brittle and has poor film-forming ability and poor mechanical properties. These materials cannot be cost-effectively manufactured. Although an organic-inorganic composite electrolyte can lead to a reduced interfacial resistance, the lithium ion conductivity and working voltages may be decreased due to the addition of the organic polymer.

The applicant's research group has previously developed the quasi-solid state electrolytes (QSSE), which may be considered as a fourth type of solid state electrolyte. In certain variants of the quasi-solid state electrolytes, a small amount of liquid electrolyte may be present to help improving the physical and ionic contact between the electrolyte and the electrode, thus reducing the interfacial resistance. Examples of QSSEs are disclosed in the following: Hui He, et al. "Lithium Secondary Batteries Containing a Non-flammable Quasi-solid Electrolyte," U.S. patent application Ser. No. 13/986,814 (Jun. 10, 2013); U.S. Pat. No. 9,368,831 (Jun. 14, 2016); U.S. Pat. No. 9,601,803 (Mar. 21, 2017); U.S. Pat. No. 9,601,805 (Mar. 21, 2017); U.S. Pat. No. 9,059,481 (Jun. 16, 2015).

In a related topic, bipolar batteries are lithium batteries that include internally stacked electrodes connected in series. In contrast to conventional lithium-ion batteries, these electrodes have a "bipolar" current collector structure. This means that the active materials for the cathode of the battery and the active materials for the anode are applied to the opposing primary surfaces of a current collector or common electrode carrier. The individual lithium-ion cells are then no longer packed separately in aluminum housings, but only the finished electrode stack (or a multi-cell battery) is given a fixed housing. This significantly reduces or eliminates the need for housing components and connecting cables, which saves costs and space in an electric vehicle. The reduced amount of connecting wires or cables results in a lower internal resistance and higher power. The space freed up can be filled with more active material. This allows the battery to store more energy and increases the vehicle's range. This is an attractive feature of lithium-ion bipolar batteries. A stringent condition for a bipolar battery to work is having an electrolyte not being allowed to migrate from one battery cell to another. This condition has essentially eliminated the use of a liquid electrolyte.

Hence, a general object of the present invention is to provide a safe, flame/fire-resistant, quasi-solid or solid-state electrolyte system for a rechargeable bipolar lithium battery.

SUMMARY

The present disclosure provides a bipolar electrode for a lithium battery, wherein the bipolar electrode comprises (a) a current collector comprising a conductive material foil preferably having a thickness from 10 nm to 100 μm (preferably from 100 nm to 20 μm and further preferably from 1 to 10 μm)) and two opposing, substantially parallel primary surfaces, wherein one or both of the primary surfaces is optionally coated with a layer of graphene or expanded graphite material having a thickness from 1 nm to 50 μm (preferably from 5 nm to 10 μm); and (b) a negative electrode layer and a positive electrode layer respectively disposed on the two primary surfaces, each in physical contact with the layer of graphene or expanded graphite material or in direct contact with a primary surface of the conductive material foil, wherein the positive electrode layer comprises a mixture of particles of a cathode active material and a quasi-solid or solid-state electrolyte and the electrolyte comprises a polymer, which is a polymerization or cross-linking product of a reactive additive, wherein the reactive additive comprises (i) a first liquid solvent that is polymerizable, (ii) an initiator and/or curing agent, and (iii) a lithium salt, wherein the first liquid solvent occupies from 1% to 99% by weight of the total weight of the reactive additive.

The current collector may comprise a metal foil (e.g., Al foil, Cu foil, stainless steel cell, etc.), a conducting polymer or polymer composite film, and/or a graphite- or graphene-reinforced composite layer. The current collector has two primary surfaces wherein preferably at least one primary surface is coated with a layer of graphene or expanded graphite to prevent lithium diffusion in the metal foil, which otherwise could degrade the function of a bipolar electrode.

In some embodiments, the first liquid solvent is selected from the group consisting of vinylene carbonate, ethylene carbonate, fluoroethylene carbonate, vinyl sulfite, vinyl ethylene sulfite, vinyl ethylene carbonate, 1,3-propyl sultone, 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, sulfones, sulfides, nitriles, sulfates, siloxanes, silanes, phosphates, phosphonates, phosphinates, phosphines, phosphine oxides, phosphonic acids, phosphorous acid, phosphites, phosphoric acids, phosphazene compounds, derivatives thereof, and combinations thereof.

In some embodiments, the negative electrode layer comprises a lithium metal layer or a layer of a mixture of particles of an anode active material and a quasi-solid or solid-state electrolyte and the electrolyte comprises a polymer, which is a polymerization or crosslinking product of a reactive additive, wherein the reactive additive comprises (i) a third liquid solvent that is polymerizable, (ii) an initiator or curing agent, and (iii) a lithium salt, wherein the third liquid solvent occupies from 1% to 99% by weight of the total weight of the reactive additive and the third liquid solvent is the same as or different from the first liquid solvent. This lithium metal layer may comprise a lithium foil, lithium particles, protected lithium particles, etc. This lithium metal layer may be absent when the bipolar electrode or the resultant bi-polar lithium battery is made and prior to the first battery charge. After the bipolar battery is charged, the primary surface at the anode side is deposited with a layer of lithium metal whose constituent lithium metal elements come from the cathode side.

In some embodiments, the third liquid solvent (the same as or different than the first liquid solvent) is selected from the group consisting of vinylene carbonate, ethylene carbonate, fluoroethylene carbonate, vinyl sulfite, vinyl ethylene sulfite, vinyl ethylene carbonate, 1,3-propyl sultone, 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, sulfones, sulfides, nitriles, sulfates, siloxanes, silanes, phosphates, phosphonates, phosphinates, phosphines, phosphine oxides, phosphonic acids, phosphorous acid, phosphites, phosphoric acids, phosphazene compounds, derivatives thereof, and combinations thereof. Some of these solvents (e.g., vinylene carbonate, ethylene carbonate) tend to have a relatively low flash points, high flammability, but good ability to dissolve a lithium salt.

In the conventional lithium-ion battery or lithium metal battery, the liquid solvents listed above are commonly used as a solvent to dissolve a lithium salt therein and the resulting solutions are used as a liquid electrolyte. These liquid solvents have a relatively high dielectric constant and, hence, are capable of dissolving a high amount of a lithium salt; however, they are typically highly volatile, having a low flash point and being highly flammable. Further, these liquid solvents are generally not known to be polymerizable, with or without the presence of a second liquid solvent, and a separate or different polymer or monomer is typically used in the industry to prepare a gel polymer electrolyte or solid polymer electrolyte.

In certain embodiments, the reactive additive (reactive liquid electrolyte) or the subsequent polymer electrolyte further comprises a second liquid solvent wherein the first liquid solvent has a lower flash point, a higher vapor pressure, a higher dielectric constant, or a higher solubility of the lithium salt as compared with the second liquid solvent.

It is uniquely advantageous to be able to polymerize the liquid solvent once the liquid electrolyte (having a lithium salt dissolved in the first liquid solvent) is mixed into an electrode (an anode active layer or a cathode active layer, for instance). With such a novel strategy, one can readily reduce the liquid solvent or completely eliminate the volatile liquid solvent all together. A desired amount of a second liquid solvent, preferably a flame-resistant liquid solvent, may be retained in the battery cell to improve the lithium ion conductivity of the electrolyte, if so desired. This strategy enables us to achieve several desirable attributes of the resultant electrolyte: no liquid electrolyte leakage issue (the in situ cured polymer being capable of holding the remaining liquid together to form a gel), adequate lithium salt amount, good lithium ion conductivity, reduced or eliminated flammability, good ability of the electrolyte to wet on anode/cathode active material surfaces (hence, significantly reduced interfacial impedance and internal resistance), processing ease, compatibility with current lithium-ion battery production processes and equipment, etc. This is of significant utility value since most of the organic solvents are known to be volatile and flammable, posing a fire and explosion danger and current solid-state electrolytes are not compatible with existing lithium-ion battery manufacturing equipment and processes. In the present bipolar electrode-based bipolar lithium battery, the electrolyte will not migrate from one unit cell to another; this is a necessary condition for a bipolar battery.

In certain preferred embodiments, the first or the second liquid solvent comprises a flame retardant selected from an organic phosphorus compound, an inorganic phosphorus compound, a halogenated derivative thereof, or a combination thereof. The organic phosphorus compound or the inorganic phosphorus compound preferably is selected from the group consisting of phosphates, phosphonates, phosphonic acids, phosphorous acids, phosphites, phosphoric acids, phosphinates, phosphines, phosphine oxides, phosphazene compounds, derivatives thereof, and combinations thereof.

In certain embodiments, the first or the second liquid solvent is selected from the group consisting of fluorinated ethers, fluorinated esters, sulfones, sulfides, nitriles, sulfates, siloxanes, silanes, combinations thereof, and combinations with phosphates, phosphonates, phosphinates, phosphines, phosphine oxides, phosphonic acids, phosphorous acid, phosphites, phosphoric acids, phosphazene compounds, derivatives thereof, and combinations thereof.

In some embodiments, the first or the second liquid solvent is selected from a phosphate, phosphonate, phosphinate, phosphine, or phosphine oxide having the structure of:

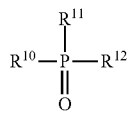

wherein $R^{10}$, $R^{11}$, and $R^{12}$, are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, and the second liquid solvent is stable under an applied electrical potential no less than 4 V.

In some embodiments, the first or the second liquid solvent comprises a phosphoranimine having the structure of:

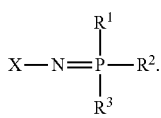

wherein $R^1$, $R^2$, and $R^3$ are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, wherein $R^1$, $R^2$, and $R^3$ are represented by at least two different substituents and wherein X is selected from the group consisting of an organosilyl group or a tert-butyl group. The $R^1$, $R^2$, and $R^3$ may be each independently selected from the group consisting of an alkoxy group, and an aryloxy group.

Preferably, the lithium salt occupies 0.1%-30% by weight and the crosslinking agent and/or initiator occupies 0.1-50% by weight of the reactive additive.

In some embodiments, the polymer electrolyte exhibits a vapor pressure less than 0.001 kPa when measured at 20° C., a vapor pressure less than 10% of the vapor pressure of the combined first liquid solvent and lithium salt alone without the polymerization, a flash point at least 100 degrees Celsius higher than a flash point of the liquid solvent alone, a flash point higher than 200° C., or no measurable flash point and wherein the polymer has a lithium ion conductivity from $10^{-8}$ S/cm to $10^{-2}$ S/cm at room temperature.

In certain embodiments, the reactive additive comprises a polymerizable first liquid solvent and a second liquid solvent and wherein the second liquid solvent either is not polymerizable or is polymerizable but polymerized to a lesser extent as compared to the first liquid solvent. The presence of this second liquid solvent is designed to impart certain desired properties to the polymerized electrolyte, such as lithium ion conductivity, flame retardancy, and the ability of the electrolyte to permeate into the electrode (anode and/or cathode) to properly wet the surfaces of the anode active material and/or the cathode active material.

Preferably, the first or the second liquid solvent is selected from a fluorinated carbonate, hydrofluoroether, fluorinated ester, sulfone, nitrile, phosphate, phosphite, alkyl phosphonate, phosphazene, sulfate, siloxane, silane, 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, dimethyl carbonate (DMC), methylethyl carbonate (MEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), or a combination thereof. High-viscosity solvents such as ethylene carbonate (EC) and low dielectric constant solvents such as diethyl carbonate (DEC) are not desirable second liquid solvent for use in the presently disclosed electrolyte.

The first or the second liquid solvents may include fluorinated monomers having unsaturation (double bonds or triple bonds that can be opened up for polymerization); e.g., fluorinated vinyl carbonates, fluorinated vinyl monomers, fluorinated esters, fluorinated vinyl esters, and fluorinated vinyl ethers). Fluorinated vinyl esters include $R_fCO_2CH=CH_2$ and Propenyl Ketones, $R_fCOCH=CHCH_3$, where $R_f$ is F or any F-containing functional group (e.g., $CF_2$— and $CF_2CF_3$—).

Two examples of fluorinated vinyl carbonates are given below:

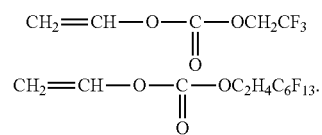

These liquid solvents can be cured in the presence of an initiator (e.g., 2-Hydroxy-2-methyl-1-phenyl-propan-1-one, Ciba DAROCUR-1173, which can be activated by UV or electron beam) if so desired:

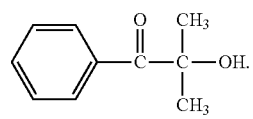

In some embodiments, the fluorinated carbonate is selected from vinyl- or double bond-containing variants of fluoroethylene carbonate (FEC), DFDMEC, FNPEC, hydrofluoro ether (HFE), trifluoro propylene carbonate (FPC), methyl nonafluorobutyl ether (MFE), or a combination thereof, wherein the chemical formulae for FEC, DFDMEC, and FNPEC, respectively are shown below:

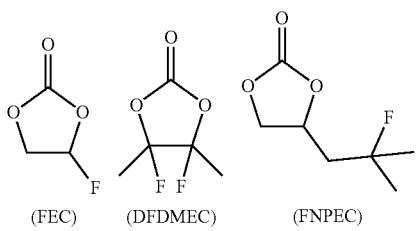

(FEC)    (DFDMEC)    (FNPEC)

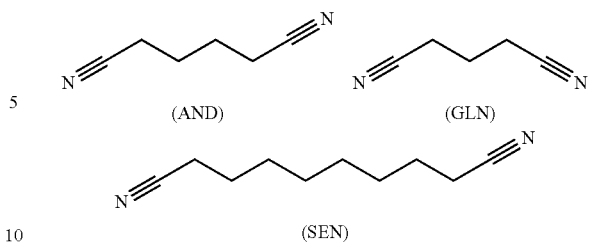

(AND)    (GLN)

(SEN)

Desirable sulfones as a first or second liquid solvent include, but not limited to, alkyl and aryl vinyl sulfones or sulfides; e.g., ethyl vinyl sulfide, allyl methyl sulfide, phenyl vinyl sulfide, phenyl vinyl sulfoxide, ethyl vinyl sulfone, allyl phenyl sulfone, allyl methyl sulfone, and divinyl sulfone:

Simple alkyl vinyl sulfones, such as ethyl vinyl sulfone, may be polymerized via emulsion and bulk methods. Propyl vinyl sulfone may be polymerized by alkaline persulfate initiators to form soft polymers. It may be noted that aryl vinyl sulfone, e.g., naphthyl vinyl sulfone, phenyl vinyl sulfone, and parra-substituted phenyl vinyl sulfone (R=$NH_2$, $NO_2$ or Br), were reported to be unpolymerizable with free-radical initiators. However, we have observed that phenyl and methyl vinyl sulfones can be polymerized with several anionic-type initiators. Effective anionic-type catalysts or initiators are n-BuLi, ZnEt2, LiN($CH_2$)$_2$, Na$NH_2$, and complexes of n-LiBu with ZnEt2 or AlEh. A second solvent, such as pyridine, sulfolane, toluene or benzene, can be used to dissolve alkyl vinyl sulfones, aryl vinyl sulfones, and other larger sulfone molecules.

Poly(sulfone)s have high oxygen indices and low smoke emission on burning. Poly(sulfone)s are inherently self-extinguishing materials owing to their highly aromatic character. In certain embodiments, the sulfone as a first or the second liquid solvent is selected from TrMS, MTrMS, TMS, or vinyl or double bond-containing variants of TrMS, MTrMS, TMS, EMS, MMES, EMES, EMEES, or a combination thereof; their chemical formulae being given below:

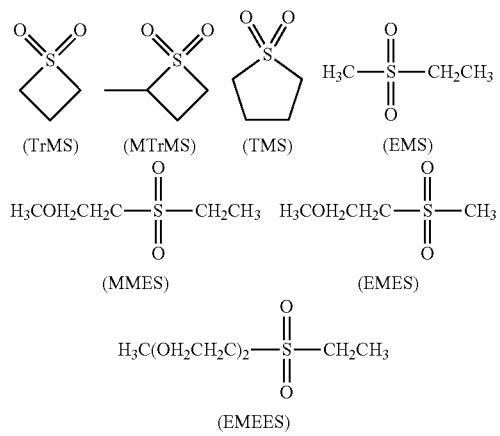

The cyclic structure, such as TrMS, MTrMS, and TMS, can be polymerized via ring-opening polymerization with the assistance of an ionic type initiator.

The first or the second liquid solvent may be a nitrile preferably selected from dinitriles, such as AND, GLN, and SEN, which have the following chemical formulae:

In some embodiments, the phosphate, phosphonate, phosphazene, phosphite, or sulfate, as a first liquid solvent or in the second liquid solvent, is selected from tris(trimethylsilyl) phosphite (TTSPi), alkyl phosphate, triallyl phosphate (TAP), ethylene sulfate (DTD), a combination thereof. The phosphate, alkyl phosphonate, or phosphazene may be selected from the following:

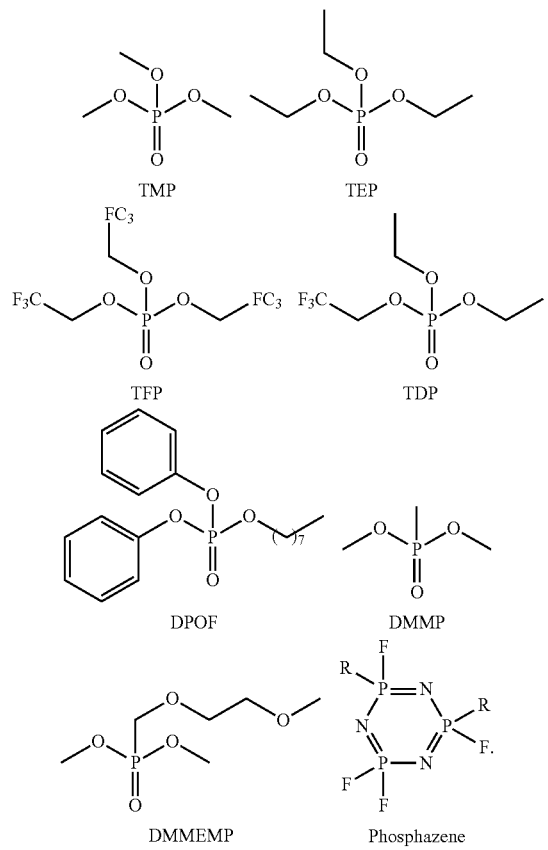

The phosphate, alkyl phosphonate, phosphonic acid, and phosphazene are flame-resistant. Good examples include diethyl vinylphosphonate, dimethyl vinylphosphonate, vinylphosphonic acid, diethyl allyl phosphate, and diethyl allylphosphonate:

The siloxane or silane in the second liquid solvent may be selected from alkylsiloxane (Si—O), alkyylsilane (Si—C), liquid oligomeric silaxane (—Si—O—Si—), or a combination thereof.

The reactive additive may further comprise an amide group selected from N,N-dimethylacetamide, N,N-diethylacetamide, N,N-dimethylformamide, N,N-diethylformamide, of a combination thereof.

In certain embodiments, the crosslinking agent comprises a compound having at least one reactive group selected from a hydroxyl group, an amino group, an imino group, an amide group, an acrylic amide group, an amine group, an acrylic group, an acrylic ester group, or a mercapto group in the molecule.

In certain embodiments, the crosslinking agent is selected from poly(diethanol) diacrylate, poly(ethyleneglycol)dimethacrylate, poly(diethanol) dimethylacrylate, poly(ethylene glycol) diacrylate, lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium oxalyldifluoroborate (LiBF$_2$C$_2$O$_4$), or a combination thereof.

The initiator may be selected from an azo compound (e.g., azodiisobutyronitrile, AIBN), azobisisobutyronitrile, azobisisoheptonitrile, dimethyl azobisisobutyrate, benzoyl peroxide tert-butyl peroxide and methyl ethyl ketone peroxide, benzoyl peroxide (BPO), bis(4-tert-butylcyclohexyl)peroxydicarbonate, t-amyl peroxypivalate, 2,2'-azobis-(2,4-dimethylvaleronitrile), 2,2'-azobis-(2-methylbutyronitrile), 1,1-azobis(cyclohexane-1-carbonitrile), benzoylperoxide (BPO), hydrogen peroxide, dodecamoyl peroxide, isobutyryl peroxide, cumene hydroperoxide, tert-butyl peroxypivalate, diisopropyl peroxydicarbonate, or a combination thereof.

In the disclosed polymer electrolyte, the lithium salt may be selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoromethanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphates (LiPF$_3$(CF$_2$CF$_3$)$_3$), lithium bisperfluoro-ethylsulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

The cathode in the disclosed lithium cell typically comprises particles of a cathode active material and the electrolyte permeates into the cathode to come in physical contact with substantially all the cathode active material particles.

In some preferred embodiments, the battery cell contains substantially no liquid solvent left therein (substantially >99% of the liquid solvent being polymerized to become a polymer). However, it is essential to initially include a liquid solvent in the cell, enabling the lithium salt to get dissociated into lithium ions and anions. A majority (>50%, preferably >70%) or substantially all of the liquid solvents is then cured (polymerized or crosslinked). With less than 1% liquid solvent, the resulting electrolyte is a solid-state electrolyte. With less than 30% liquid solvent, we have a quasi-solid electrolyte. Both are highly flame-resistant.

A lower proportion of the liquid solvent in the electrolyte leads to a significantly reduced vapor pressure and increased flash point or completely eliminated flash point (un-detectable). Although typically by reducing the liquid solvent proportion one tends to observe a reduced lithium ion conductivity for the resulting electrolyte; however, quite surprisingly, after a threshold liquid solvent fraction, this trend is diminished or reversed (the lithium ion conductivity can actually increase with reduced liquid solvent in some cases).

The crosslinking agent preferably comprises a compound having at least one reactive group selected from a hydroxyl group, an amino group, an imino group, an amide group, an amine group, an acrylic group, or a mercapto group in the molecule. In some desired embodiments, the crosslinking agent may be selected from a chemical species represented by Chemical formula 1 below:

(Chemical Formula 1)

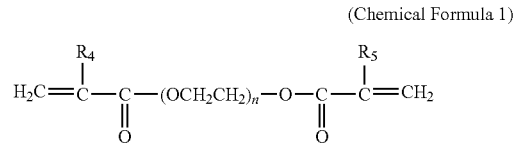

where $R_4$ and $R_5$ are each independently hydrogen or methyl group, and n is an integer from 3 to 30, wherein R' is $C_1$~$C_5$ alkyl group.

In some embodiments, the crosslinking agent may be selected from N,N-methylene bisacrylamide, epichlorohydrin, 1,4-butanediol diglycidyl ether, tetrabutylammonium hydroxide, cinnamic acid, ferric chloride, aluminum sulfate octadecahydrate, diepoxy, dicarboxylic acid compound, poly(potassium 1-hydroxy acrylate) (PKHA), glycerol diglycidyl ether (GDE), ethylene glycol, polyethylene glycol, polyethylene glycol diglycidyl ether (PEGDE), citric acid, acrylic acid, methacrylic acid, a derivative compound of acrylic acid, a derivative compound of methacrylic acid, glycidyl functions, N,N'-Methylenebisacrylamide (MBAAm), Ethylene glycol dimethacrylate (EGDMAAm), isobornyl methacrylate, poly (acrylic acid) (PAA), methyl methacrylate, isobornyl acrylate, ethyl methacrylate, isobutyl methacrylate, n-Butyl methacrylate, ethyl acrylate, 2-Ethyl hexyl acrylate, n-Butyl acrylate, a diisocyanate, an urethane chain, a chemical derivative thereof, or a combination thereof.

The polymer in the electrolyte may form a mixture, copolymer, semi-interpenetrating network, or simultaneous interpenetrating network with a second polymer selected from poly(ethylene oxide), polypropylene oxide, poly(ethylene glycol), poly(acrylonitrile), poly(methyl methacrylate), poly(vinylidene fluoride), poly bis-methoxy ethoxyethoxide-phosphazenex, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof. This second polymer may be pre-mixed into an anode and/or a cathode. Alternatively, this second polymer may be dissolved in the liquid solvent where appropriate or possible to form a solution prior to being injected into the battery cell.

In certain desirable embodiments, the electrolyte further comprises particles of an inorganic solid electrolyte material having a particle size from 2 nm to 30 μm, wherein the particles of inorganic solid electrolyte material are dispersed in the polymer or chemically bonded by the polymer. The particles of inorganic solid electrolyte material are preferably selected from an oxide type, sulfide type, hydride type, halide type, borate type, phosphate type, lithium phosphorus oxynitride (LiPON), garnet-type, lithium superionic conductor (LISICON) type, sodium superionic conductor (NASICON) type, or a combination thereof.

The disclosure also provides a bipolar lithium battery comprising at least two bipolar electrodes as defined above, wherein the at least two bipolar electrodes are connected in series in such a manner that an ion-permeable separator is disposed between the negative electrode layer of a bipolar electrode and the positive electrode layer of a neighboring bipolar electrode.

Preferably, in the bipolar lithium battery, the separator comprises the quasi-solid or solid-state electrolyte.

The bipolar lithium cell may be a lithium metal secondary battery, a lithium-ion battery, a lithium-sulfur battery, a lithium-ion sulfur battery, a lithium-selenium battery, or a lithium-air battery.

The reactive electrolyte composition (reactive additive) is designed to permeate into the internal structure of the cathode and to be in physical contact or ionic contact with the cathode active material in the cathode, and to permeate into the anode electrode to be in physical contact or ionic contact with the anode active material where/if present.

The flash point of the quasi-solid electrolyte is typically at least 100 degrees higher than the flash point of the same organic liquid solvent without being polymerized. In most of the cases, either the flash point is higher than 200° C. or no flash point can be detected. The electrolyte just would not catch on fire or get ignited. Any accidentally initiated flame does not sustain for longer than a few seconds. This is a highly significant discovery, considering the notion that fire and explosion concern has been a major impediment to widespread acceptance of battery-powered electric vehicles. This new technology could potentially reshape the landscape of EV industry.

Still another preferred embodiment of the present invention is a rechargeable lithium-sulfur battery or lithium-ion sulfur battery containing a sulfur cathode having sulfur or lithium polysulfide as a cathode active material.

For a lithium metal battery (wherein lithium metal is the primary active anode material), the current collector may comprise a metal foil (e.g., Al foil, Cu foal, stainless steel cell) having two primary surfaces wherein at least one primary surface is coated with a layer of graphene, or expanded graphite. One coated primary surface (the anode side) may be further coated with or protected by a layer of lithiophilic metal (a metal capable of forming a metal-Li solid solution or is wettable by lithium ions), a layer of graphene material, or both. The lithiophilic metal is preferably selected from Au, Ag, Mg, Zn, Ti, K, Al, Fe, Mn, Co, Ni, Sn, V, Cr, an alloy thereof, or a combination thereof.

For a lithium ion battery featuring the presently disclosed electrolyte, there is no particular restriction on the selection of an anode active material. The anode active material may be selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobate, lithium-containing titanium oxide, lithium transition metal oxide, $ZnCo_2O_4$; (f) carbon or graphite particles (g) prelithiated versions thereof; and (h) combinations thereof.

In some embodiments, the anode active material contains a prelithiated Si, prelithiated Ge, prelithiated Sn, prelithiated $SnO_x$, prelithiated $SiO_x$, prelithiated iron oxide, prelithiated $V_2O_5$, prelithiated $V_3O_8$, prelithiated $Co_3O_4$, prelithiated $Ni_3O_4$, or a combination thereof, wherein x=1 to 2.

The separator may comprise the presently disclosed electrolyte. In certain embodiments, the separator comprises polymeric fibers, ceramic fibers, glass fibers, or a combination thereof. These fibers may be stacked together in such a manner that there are pores that allow for permeation of lithium ions, but not for penetration of any potentially formed lithium dendrites. These fibers may be dispersed in a matrix material or bonded by a binder material. This matrix or binder material may contain a ceramic or glass material. The polymer electrolyte herein disclosed may serve as the matrix material or binder material that helps to hold these fibers together. The separator may contain particles of a glass or ceramic material (e.g., metal oxide, metal carbide, metal nitride, metal boride, etc.).

The present disclosure also provides a method of producing the disclosed bipolar electrode. In certain embodiments, the method comprises: (a) providing a current collector comprising a conductive material foil having a thickness from 10 nm to 100 μm and two (substantially parallel) opposing primary surfaces, wherein one or both of the primary surfaces is optionally coated with a layer of graphene or expanded graphite material having a thickness from 5 nm to 50 μm; (b) depositing a reactive cathode layer onto a first primary surface of a current collector to form a reactive cathode layer-coated current collector, wherein the reactive cathode layer comprises a mixture of multiple particles of a cathode active material, a conductive additive, and a reactive liquid electrolyte composition comprising at least a polymerizable first liquid solvent, a lithium salt dissolved in the first liquid solvent, and a crosslinking agent and/or an initiator, wherein the first liquid solvent occupies from 1% to 99% by weight based on the total weight of the reactive liquid electrolyte composition; and (c) partially or totally polymerizing or crosslinking the first liquid solvent to obtain a cathode active layer-coated current collector wherein from 30% to 100% by weight of the polymerizable first liquid solvent is polymerized or crosslinked to become a quasi-solid or solid-state electrolyte that chemically bonds the multiple particles of the cathode active material and the conductive additive together to form a cathode active layer that adheres to the first primary surface.

In certain embodiment, the reactive liquid electrolyte further comprises from 1% to 90% by weight of a second liquid solvent and the first liquid solvent has a lower flash point, a higher vapor pressure, a higher dielectric constant, or a higher solubility of the lithium salt as compared with the second liquid solvent.

The method may further comprise a step (d) of depositing an anode active layer to a second primary surface of the current collector to form the bipolar electrode. In some preferred embodiments, step (d) comprises (i) depositing a reactive anode layer onto the second primary surface of the current collector to form a reactive anode layer-coated current collector, wherein the reactive anode layer comprises a mixture of multiple particles of an anode active material, a conductive additive, and a reactive liquid electrolyte composition comprising at least a third polymerizable liquid solvent, a lithium salt dissolved in the third liquid solvent, and a crosslinking agent and/or an initiator, wherein the third liquid solvent occupies from 1% to 99% by weight based on the total weight of the reactive liquid electrolyte composition; and (ii) partially or totally polymerizing/crosslinking the third liquid solvent to obtain a cathode active layer-coated current collector wherein from 30% to 100% by weight of the polymerizable first liquid solvent is polymerized/crosslinked to become a quasi-solid or solid-state electrolyte that chemically bonds the multiple particles of the anode active material and the conductive additive together to form an anode active layer that adheres to the second primary surface.

The reactive liquid electrolyte composition in the reactive anode layer may further comprise from 1% to 99% of a second liquid solvent, wherein the third liquid solvent has a lower flash point, a higher vapor pressure, a higher dielectric constant, or a higher solubility of the lithium salt as compared with the second liquid solvent.

The first liquid solvent may be selected from the group consisting of vinylene carbonate, ethylene carbonate, fluoroethylene carbonate, vinyl sulfite, vinyl ethylene sulfite, vinyl ethylene carbonate, 1,3-propyl sultone, 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, sulfones, sulfides, nitriles, sulfates, siloxanes, silanes, phosphates, phosphonates, phosphinates, phosphines, phosphine oxides, phosphonic acids, phosphorous acid, phosphites, phosphoric acids, phosphazene compounds, derivatives thereof, and combinations thereof.

The third liquid solvent, the same as or different from the first liquid solvent, may be selected from the group consisting of vinylene carbonate, ethylene carbonate, fluoroethylene carbonate, vinyl sulfite, vinyl ethylene sulfite, vinyl ethylene carbonate, 1,3-propyl sultone, 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, sulfones, sulfides, nitriles, sulfates, siloxanes, silanes, phosphates, phosphonates, phosphinates, phosphines, phosphine oxides, phosphonic acids, phosphorous acid, phosphites, phosphoric acids, phosphazene compounds, derivatives thereof, and combinations thereof.

Preferably, step (c) either does not polymerize the second liquid solvent or polymerizes the second liquid solvent to a different extent as compared to the polymerizable first liquid solvent.

In some preferred embodiments, the process associated with the method is conducted in a roll-to-roll manner to produce a roll of bipolar electrode. One can then un-wind the roll, cut and trim into a desired number of bipolar electrodes of desired dimensions. Alternatively, one can produce one or multiple bipolar electrodes of desired dimensions at a time using a machine system. Slurry coating, casting or spraying and drying machines are well-known in the art.

The disclosure further provides a method of producing a bipolar electrode, the method comprising: (A) mixing particles of a cathode active material, a conductive additive, and a reactive liquid electrolyte to form a reactive cathode layer and depositing the reactive cathode layer to a primary surface of a current collector, wherein the reactive additive comprises (i) a first liquid solvent that is polymerizable, (ii) an initiator and/or curing agent, and (iii) a lithium salt dissolved in the first liquid solvent, wherein the cathode active material occupies from 35% to 95% by weight based on the total weight of the reactive cathode layer; (B) mixing particles of an anode active material, a conductive additive, and a reactive liquid electrolyte to form a reactive anode layer and depositing the reactive anode layer to a second primary surface of the current collector, wherein the reactive additive comprises (i) a third liquid solvent that is polymerizable, (ii) an initiator and/or curing agent, and (iii) a lithium salt dissolved in the third liquid solvent, wherein the anode active material occupies from 35% to 95% by weight based on the total weight of the reactive anode layer; and (C) partially or totally polymerizing the first solvent and the third solvent to obtain the bipolar electrode.

Step (A) may further comprise adding particles of an inorganic solid electrolyte powder in the cathode or in the anode.

For all the methods disclosed above, the first liquid solvent (or third liquid solvent) and the second liquid solvent typically are polymerized and/or crosslinked to different extents even under the same conditions. The second liquid solvent may be chosen to be non-polymerizable.

The procedure of polymerizing and/or crosslinking may comprise exposing the reactive additive to heat, UV, high-energy radiation, or a combination thereof. The high-energy radiation may be selected from electron beam, Gamma radiation, X-ray, neutron radiation, etc. Electron beam irradiation is particularly useful.

These and other advantages and features of the present invention will become more transparent with the description of the following best mode practice and illustrative examples.

DETAILED DESCRIPTION

Figure 1:
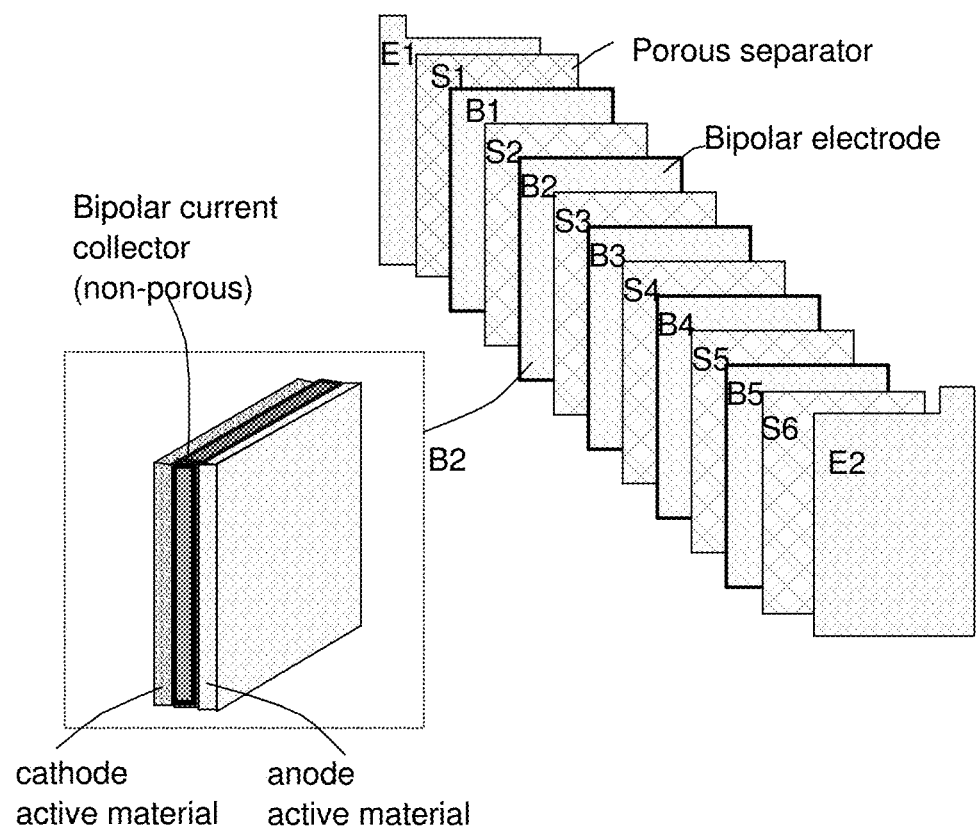
FIG. 1 Schematic of a bipolar lithium-ion battery according to some embodiments of the present disclosure.

The present invention provides a safe and high-performing lithium battery, which can be any of various types of lithium-ion or lithium metal batteries. A high degree of safety is imparted to this battery by a novel and unique electrolyte that is highly flame-resistant and would not initiate a fire or sustain a fire and, hence, would not pose explosion danger. This invention has solved the very most critical issue that has plagued the lithium-metal and lithium-ion industries for more than two decades. As indicated earlier in the Background section, a strong need exists for a safe, non-flammable quasi-solid electrolyte or solid-state electrolyte system for a rechargeable lithium battery, particularly a bipolar lithium battery.

The present disclosure provides a bipolar electrode for a lithium battery, wherein the bipolar electrode comprises (a) a current collector comprising a conductive material foil having a thickness from 10 nm to 100 µm and two opposing, substantially parallel primary surfaces, wherein one or both of the primary surfaces is optionally coated with a layer of graphene or expanded graphite material having a thickness from 1 nm to 50 μm; and (b) a negative electrode layer and a positive electrode layer respectively disposed on the two primary surfaces, each in physical contact with the layer of graphene or expanded graphite material or in direct contact with a primary surface of the conductive material foil, wherein the positive electrode layer comprises a mixture of particles of a cathode active material and a quasi-solid or solid-state electrolyte and the electrolyte comprises a polymer, which is a polymerization or crosslinking product of a reactive additive, wherein the reactive additive comprises (i) a first liquid solvent that is polymerizable, (ii) an initiator or curing agent, and (iii) a lithium salt, wherein the first liquid solvent occupies from 1% to 99% by weight of the total weight of the reactive additive.

In some embodiments, the first liquid solvent is selected, as examples, from the group consisting of vinylene carbonate, ethylene carbonate, fluoroethylene carbonate, vinyl sulfite, vinyl ethylene sulfite, vinyl ethylene carbonate, 1,3-propyl sultone, 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, sulfones, sulfides, nitriles, sulfates, siloxanes, silanes, phosphates, phosphonates, phosphinates, phosphines, phosphine oxides, phosphonic acids, phosphorous acid, phosphites, phosphoric acids, phosphazene compounds, derivatives thereof, and combinations thereof.

In some embodiments, the negative electrode layer comprises a mixture of particles of an anode active material and a quasi-solid or solid-state electrolyte and the electrolyte comprises a polymer, which is a polymerization or crosslinking product of a reactive additive, wherein the reactive additive comprises (i) a third liquid solvent that is polymerizable, (ii) an initiator or curing agent, and (iii) a lithium salt, wherein the third liquid solvent occupies from 1% to 99% by weight of the total weight of the reactive additive and the third liquid solvent is the same as or different from the first liquid solvent.

In some embodiments, the third liquid solvent (the same as or different than the first liquid solvent) is selected from the group consisting of vinylene carbonate, ethylene carbonate, fluoroethylene carbonate, vinyl sulfite, vinyl ethylene sulfite, vinyl ethylene carbonate, 1,3-propyl sultone, 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, sulfones, sulfides, nitriles, sulfates, siloxanes, silanes, phosphates, phosphonates, phosphinates, phosphines, phosphine oxides, phosphonic acids, phosphorous acid, phosphites, phosphoric acids, phosphazene compounds, derivatives thereof, and combinations thereof. Some of these solvents (e.g., vinylene carbonate, ethylene carbonate) tend to have a relatively low flash points, high flammability, but good ability to dissolve a lithium salt.

The current collector may comprise a metal foil (e.g., Al foil, Cu foil, stainless steel cell, etc.), a conducting polymer or polymer composite layer, a graphite layer (expanded graphite or recompressed graphite worm) layer, or graphene layer. The current collector has two primary surfaces wherein at least one primary surface is coated with a protective layer of graphene or expanded graphite to prevent lithium diffusion in the metal foil, which otherwise could defeat the purpose of a bipolar electrode. This protective graphene/graphite coating layer mat contain just the graphene, expanded graphite flakes, and/or recompressed exfoliated graphite worms or a composite layer comprising graphene sheets, expanded graphite flakes, and/or recompressed exfoliated graphite worms that are dispersed in or bonded by a matrix or binder material. The bonder/matrix material may be selected from a polymer, glass, ceramic, or carbon material.

Another embodiment of the present invention is a stack of multiple bipolar electrodes separated by a lithium-ion permeable membrane (separator) between two bipolar electrodes that are internally connected in series. The resulting bipolar battery comprises multiple unit cells, each cell comprising an anode layer (coated on a bipolar current collector), a separator, and a cathode layer (coated on neighboring current collector). As illustrated in FIG. 1 as one example, the internal series connection (ISC) technology involves combining a desired number of bipolar electrodes (e.g., B1-B5), separated from one another by a porous separator (e.g., S1-S6), and cladded by two terminal electrodes (E1 and E2). In this configuration, only these two terminal electrodes are externally connected to the outside circuit and all the intermediate bipolar electrodes are isolated from the outside circuit. Series connection provides a high voltage output, which is the sum of the voltage values of all cells: for instance, if one cell giving 3.7 volts (e.g., for a graphite-LiCo$_2$ cell), then two cells giving 7.4 volts, and n cells giving 3.7n volts, etc. The number n can be any integer that is 2 or greater than 2 (for practical purposes, n is from 2 to 1,000).

FIG. 1 provides but one example of the many possible combinations for high-voltage stacks. The five intermediate electrodes (B1-B5) are bipolar electrodes, each composed of a non-porous conductive metal foil having one primary surface coated with an anode active material layer and the opposing primary surface coated with a cathode active material layer. The separator S1 is inserted between terminal electrode E1 and the first bipolar electrode B1 and the separator S2 is inserted between bipolar electrode B1 and bipolar electrode B2, etc. Such a configuration implies that each separator is sandwiched between an anode layer of a bipolar electrode and a cathode layer of a neighboring bipolar electrode to form a unit cell. For instance, S2 is sandwiched between the anode layer coated on B1 and the cathode layer coated on B2 to form a unit cell, and S3 is sandwiched between the anode layer coated on B2 and the cathode layer coated on B3 to form another unit cell. These two unit cells are naturally connected in-series through the metal foil at B2, without using an external wire and terminal and, thereby, reducing the weight, volume, and electrical resistance of a lithium battery stack.

During a charging step, lithium ions come out of the cathode active material layer and travels through a separator into an anode active material layer, which belongs to the same unit cell but supported by a different bipolar current collector. During a subsequent discharge step, ions travel in the opposite direction. These lithium ions are confined in a unit cell, and not to be allowed to stray into a neighboring cell. This condition can be met if the electrolyte is a solid-state electrolyte and the current collector is made out of an electrically conductive material that is not permeable to lithium ions. The graphene or expanded graphite (or exfoliated graphite worm) coating makes the metal foil non-permeable to lithium ions. Liquid electrolyte can easily migrate from one unit cell to another. We have surprisingly discovered that a quasi-solid electrolyte will not migrate from one cell to another cell provided the content of the non-polymerized solvent is no greater than 50% by weight and preferably no greater than 30% by weight.

The number of unit cells in a stack depends upon the needed output voltage of the stack. Using a unit cell voltage of 3.7 volts as a basis, a lithium-ion battery stack for use in an electric power scooter (48V), for instance, will require 13 unit cells connected in series. Such a stack constitutes a lithium-ion battery "element" which, if inserted into a casing and fitted with a PC board (control electronics), makes a great power module.

Figure 3A:
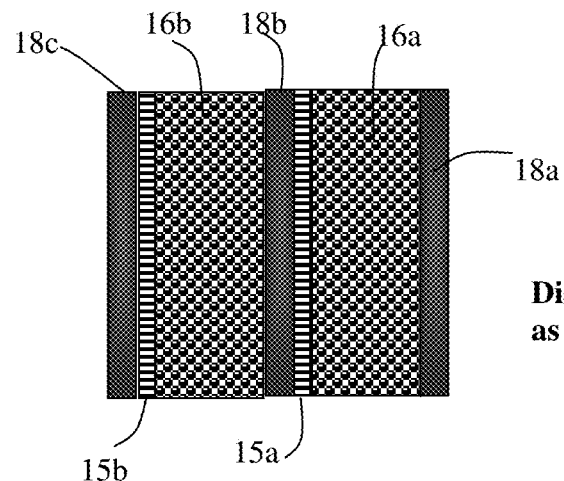
FIG. 3(A) Structure of a bipolar anode-less lithium metal battery (as manufactured or in a discharged state) according to some embodiments of the present disclosure.
Figure 3B:
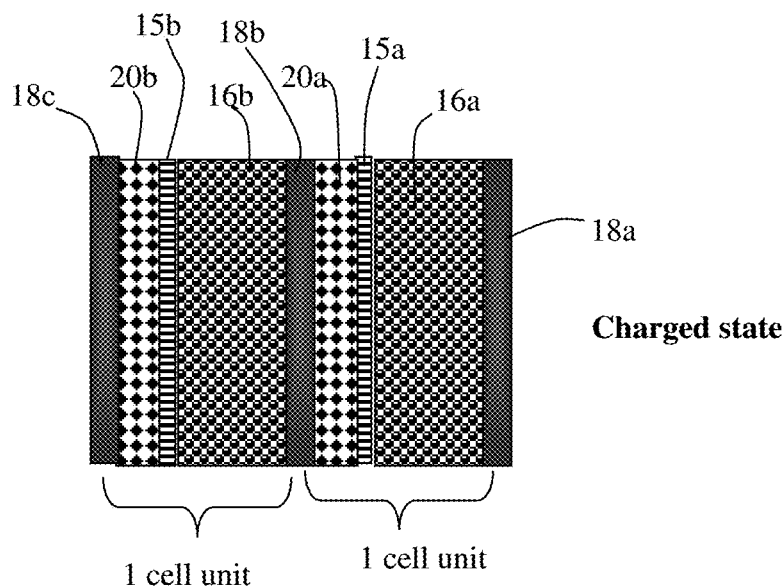
FIG. 3(B) Structure of a bipolar anode-less lithium metal battery (in a charged state) according to some embodiments of the present disclosure.

In a special battery configuration, a primary surface of the bipolar current collector is deposited with a cathode active material layer containing particles of a cathode active material (e.g., $LiCoO_2$, $LiMn_2O_4$, etc.) having available Li atoms in the structure; but the opposing primary surface is not deposited with any anode material (as schematically illustrated in FIG. 3(A)) or is deposited with a lithium metal-protecting layer only (such as an elastic polymer or a graphene ball layer) but no lithium metal or other anode active material when the bipolar electrode or the bipolar battery is made (prior to the first charge step). Such a bipolar lithium battery is herein referred to as an "anode-less" bipolar lithium metal battery. During the discharge step, lithium ions come out of the cathode material structure, traverse a separator, and move to the anode side where the lithium ions deposit onto the opposing primary surface of the current collector to form a lithium metal layer. This is illustrated in FIG. 3(B).

The presently invented internal series connection (ISC) bipolar battery technology has the following features:

(1) The stack perimeter should be properly sealed to ensure that each and every constituent cell is isolated from one another; this is readily achievable with a solid-state electrolyte or quasi-solid electrolyte herein disclosed. In addition, none of the bipolar current collectors can be porous; they have to be absolutely impermeable to electrolyte. This is achieved by using a solid metal foil which is preferably further protected by a graphene or expanded graphite layer. The electrolyte from one unit cell is not allowed to enter another unit cell; there is no fluid communication between two cells.

(2) Any output voltage (V) and capacity value (mAh) can be tailor-made by selecting a proper number of unit cells and the lateral dimensions and thickness of the anode layer and the cathode layer of a unit cell; any practical voltage can be easily obtained.

(3) During re-charge, each constituent cell in a multi-cell battery stack can adjust itself to attain voltage distribution equilibrium, removing the need for the high-voltage stack to have a protective circuit.

In the conventional lithium-ion battery or lithium metal battery industry, the liquid solvents listed above are commonly used as a solvent to dissolve a lithium salt therein and the resulting solutions are used as a liquid electrolyte. These liquid solvents have a relatively high dielectric constant and, hence, are capable of dissolving a high amount of a lithium salt. However, they are typically highly volatile, having a low flash point and being highly flammable. Further, these liquid solvents are generally not known to be polymerizable, with or without the presence of a second liquid solvent, and a separate or different polymer or monomer is typically used in the industry to prepare a gel polymer electrolyte or solid polymer electrolyte.

It is highly advantageous to be able to polymerize the liquid solvent once the liquid electrolyte (having a lithium salt dissolved in the first liquid solvent) is mixed with particles of an electrode active material (cathode active material or anode active material) or injected into an electrode (cathode layer or anode layer). With such an innovative strategy, one can readily reduce the liquid solvent (leaving behind select non-flammable or flame-retardant solvent only) or completely eliminate the volatile liquid solvent all together. A desired amount of a second liquid solvent, preferably a flame-resistant liquid solvent, may be retained in the battery cell to improve the lithium-ion conductivity of the electrolyte. Desirable flame retardant-type second liquid solvents are, as examples, alkyl phosphates, alkyl phosphonates, phosphazenes, hydrofluoroethers, fluorinated ethers, and fluorinated esters.

This strategy enables us to achieve several desirable features of the resultant electrolytes and bipolar batteries:
  a) no liquid electrolyte leakage issue (the in situ cured polymer being capable of holding the remaining liquid together to form a gel);
  b) adequate lithium salt amount can be dissolved in the electrolyte, enabling a good lithium ion conductivity;
  c) reduced or eliminated flammability (only a solid polymer and a non-flammable second liquid are retained in the cell);
  d) good ability of the electrolyte to wet on anode/cathode active material surfaces (hence, significantly reduced interfacial impedance and internal resistance);
  e) processing ease and compatibility with current lithium-ion battery production processes and equipment, etc.; and
  f) enabling a high cathode active material proportion in the cathode electrode (typically 75-97%, in contrast to typically less than 75% by weight of the cathode active material when working with a conventional solid polymer electrolyte or inorganic solid electrolyte.

This disclosed in situ-cured polymer electrolyte approach is of significant utility value since most of the organic solvents are known to be volatile and flammable, posing a fire and explosion danger. Further, current solid-state electrolytes are not compatible with existing lithium-ion battery manufacturing equipment and processes.

In certain preferred embodiments, the first (or the third) or the second liquid solvent comprises a flame-resisting or flame-retardant liquid selected from an organic phosphorus compound, an inorganic phosphorus compound, a halogenated derivative thereof, or a combination thereof. The organic phosphorus compound or the inorganic phosphorus compound preferably is selected from the group consisting of phosphates, phosphonates, phosphonic acids, phosphorous acids, phosphites, phosphoric acids, phosphinates, phosphines, phosphine oxides, phosphazene compounds, derivatives thereof, and combinations thereof.

In certain embodiments, the first (or the third) or the second liquid solvent is selected from the group consisting of fluorinated ethers, fluorinated esters, sulfones, sulfides, nitriles, sulfates, siloxanes, silanes, phosphates, phosphonates, phosphinates, phosphines, phosphine oxides, phosphonic acids, phosphorous acid, phosphites, phosphoric acids, phosphazene compounds, derivatives thereof, and combinations thereof.

In some embodiments, the second liquid solvent is selected from a phosphate, phosphonate, phosphinate, phosphine, or phosphine oxide having the structure of:

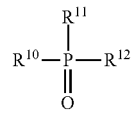

wherein $R^{10}$, $R^{11}$, and $R^{12}$, are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, and the second liquid solvent is stable under an applied electrical potential no less than 4 V.

In some embodiments, the second liquid solvent comprises a phosphoranimine having the structure of:

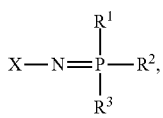

wherein $R^1$, $R^2$, and $R^3$ are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, wherein $R^1$, $R^2$, and $R^3$ are represented by at least two different substituents and wherein X is selected from the group consisting of an organosilyl group or a tert-butyl group. The $R^1$, $R^2$, and $R^3$ may be each independently selected from the group consisting of an alkoxy group, and an aryloxy group.

The polymer electrolyte typically has a lithium ion conductivity from $10^{-8}$ S/cm to $10^{-2}$ S/cm at room temperature. The cathode active layer may contain a cathode active material (along with a conductive additive and an optional resin binder). The anode may have no anode active material in the beginning when the battery is made. It may be noted that if no conventional anode active material, such as graphite, Si, SiO, Sn, or conversion-type anode materials, and no lithium metal is present in the battery when the battery is assembled and before the battery begins to charge and discharge, the battery is commonly referred to as an "anode-less" lithium battery.

It may be noted that these first liquid solvents, upon polymerization, become essentially non-flammable. These liquid solvents were typically known to be useful for dissolving a lithium salt and not known for their polymerizability or their potential as an electrolyte polymer.

In some preferred embodiments, the battery contains substantially no volatile liquid solvent therein after polymerization. However, it is essential to initially include a liquid solvent in the cell, enabling the lithium salt to get dissociated into lithium ions and anions. A majority (>50%, preferably >70%) or substantially all of the first liquid solvent (particularly the organic solvent) is then polymerized. With substantially 0% liquid solvent, the resulting electrolyte is a solid-state electrolyte. With less than 30% liquid solvent, we have a quasi-solid electrolyte. Both are highly flame-resistant.

In certain embodiments, the electrolyte exhibits a vapor pressure less than 0.001 kPa when measured at 20° C., a vapor pressure less than 60% of the vapor pressure of the combined first liquid solvent and lithium salt alone prior to polymerization, a flash point at least 100 degrees Celsius higher than a flash point of the liquid solvent prior to polymerization, a flash point higher than 200° C., or no measurable flash point and wherein the polymer has a lithium ion conductivity from $10^{-8}$ S/cm to $10^{-2}$ S/cm at room temperature.

A lower proportion of the unpolymerized liquid solvent in the electrolyte leads to a significantly reduced vapor pressure and increased flash point or completely eliminated flash point (un-detectable). Although typically by reducing the liquid solvent proportion one tends to observe a reduced lithium ion conductivity for the resulting electrolyte; however, quite surprisingly, after a threshold liquid solvent fraction, this trend is diminished or reversed (the lithium ion conductivity can actually increase with reduced liquid solvent in some cases).

In certain embodiments, the reactive additive comprises a first polymerizable liquid solvent and a second liquid solvent and wherein the second liquid solvent either is not polymerizable or is polymerizable but polymerized to a lesser extent as compared to the first polymerizable liquid solvent. The presence of this second liquid solvent is designed to impart certain desired properties to the polymerized electrolyte, such as lithium ion conductivity, flame retardancy, ability of the electrolyte to permeate into the electrode (anode and/or cathode) to properly wet the surfaces of the anode active material and/or the cathode active material.

In some embodiments, the first or the second liquid solvent is selected from a fluorinated carbonate, hydrofluoroether, fluorinated ester, sulfone, nitrile, phosphate, phosphite, alkyl phosphonate, phosphazene, sulfate, siloxane, silane, 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), or a combination thereof.

Desirable polymerizable liquid solvents can include fluorinated monomers having unsaturation (double bonds or triple bonds) in the backbone or cyclic structure (e.g., fluorinated vinyl carbonates, fluorinated vinyl monomers, fluorinated esters, fluorinated vinyl esters, and fluorinated vinyl ethers). These chemical species may also be used as a second liquid solvent in the presently disclosed electrolyte. Fluorinated vinyl esters include $R_fCO_2CH=CH_2$ and Propenyl Ketones, $R_fCOCH=CHCH_3$, where $R_f$ is F or any F-containing functional group (e.g., $CF_2—$ and $CF_2CF_3—$).

Two examples of fluorinated vinyl carbonates are given below:

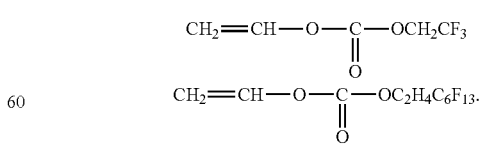

These liquid solvents, as a monomer, can be cured in the presence of an initiator (e.g., 2-Hydroxy-2-methyl-1-phenyl-propan-1-one, Ciba DAROCUR-1173, which can be activated by UV or electron beam):

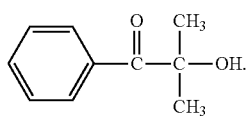

In some embodiments, the fluorinated carbonate is selected from vinyl- or double bond-containing variants of fluoroethylene carbonate (FEC), DFDMEC, FNPEC, hydrofluoro ether (HFE), trifluoro propylene carbonate (FPC), or methyl nonafluorobutyl ether (MFE), wherein the chemical formulae for FEC, DFDMEC, and FNPEC, respectively are shown below:

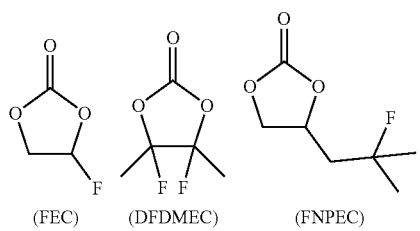

Desirable sulfones or sulfides as a polymerizable first liquid solvent or as a second liquid solvent include, but not limited to, alkyl and aryl vinyl sulfones or sulfides; e.g., ethyl vinyl sulfide, allyl methyl sulfide, phenyl vinyl sulfide, phenyl vinyl sulfoxide, ethyl vinyl sulfone, allyl phenyl sulfone, allyl methyl sulfone, and divinyl sulfone; some examples are shown below:

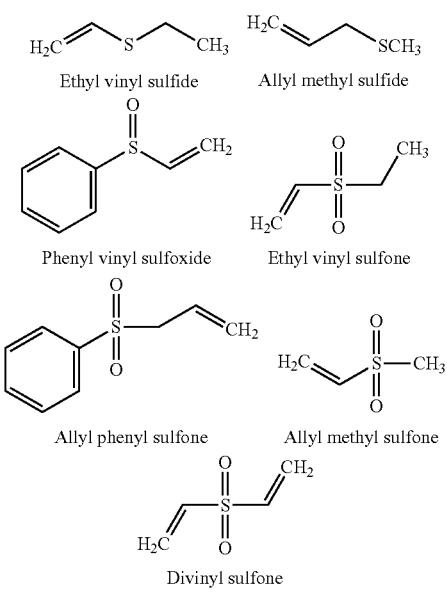

Simple alkyl vinyl sulfones, such as ethyl vinyl sulfone, may be polymerized via emulsion and bulk methods. Propyl vinyl sulfone may be polymerized by alkaline persulfate initiators to form soft polymers. It may be noted that aryl vinyl sulfone, e.g., naphthyl vinyl sulfone, phenyl vinyl sulfone, and parra-substituted phenyl vinyl sulfone (R=$NH_2$, $NO_2$ or Br), were reported to be unpolymerizable with free-radical initiators. However, we have observed that phenyl and methyl vinyl sulfones can be polymerized with several anionic-type initiators. Effective anionic-type catalysts or initiators are n-BuLi, ZnEt2, LiN($CH_2$)$_2$, NaNH$_2$, and complexes of n-LiBu with ZnEt2 or AlEh. A second solvent, such as pyridine, sulfolane, toluene or benzene, can be used to dissolve alkyl vinyl sulfones, aryl vinyl sulfones, and other larger sulfone molecules.

In certain embodiments, the sulfone is selected from TrMS, MTrMS, TMS, or vinyl or double bond-containing variants of TrMS, MTrMS, TMS, EMS, MMES, EMES, EMEES, or a combination thereof; their chemical formulae being given below:

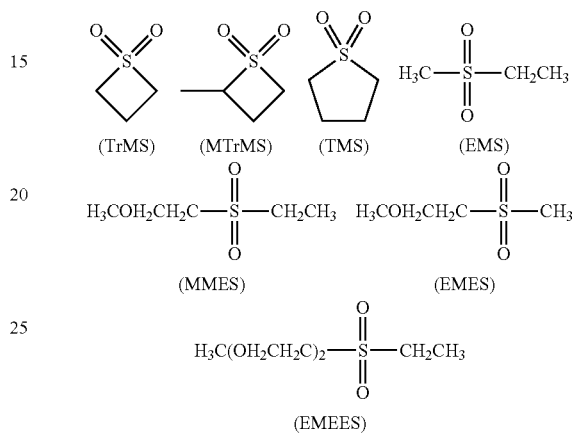

The cyclic structure, such as TrMS, MTrMS, and TMS, can be polymerized via ring-opening polymerization with the assistance of an ionic type initiator.

The nitrile may be selected from AND, GLN, SEN, or a combination thereof and their chemical formulae are given below:

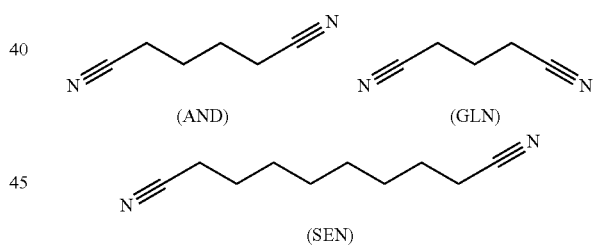

In some embodiments, the phosphate (including various derivatives of phosphoric acid), alkyl phosphonate, phosphazene, phosphite, or sulfate is selected from tris(trimethylsilyl) phosphite (TTSPi), alkyl phosphate, triallyl phosphate (TAP), ethylene sulfate (DTD), a combination thereof, or a combination with 1,3-propane sultone (PS) or propene sultone (PES). The phosphate, alkyl phosphonate, or phosphazene may be selected from the following:

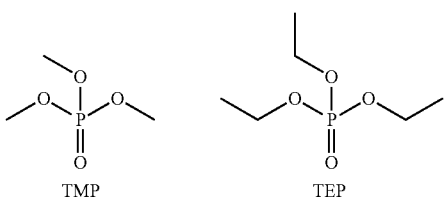

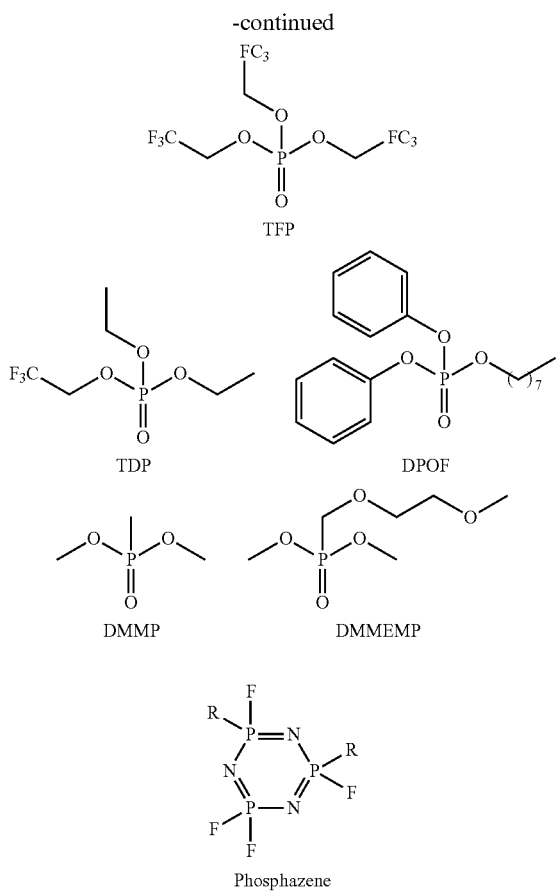

wherein R=H, NH$_2$, or C$_1$-C$_6$ alkyl.

Phosphonate moieties can be readily introduced into vinyl monomers to produce allyl-type, vinyl-type, styrenic-type and (meth)acrylic-type monomers bearing phosphonate groups (e.g., either mono or bisphosphonate). These liquid solvents may serve as a first or a second liquid solvent in the electrolyte composition. The phosphate, alkyl phosphonate, phosphonic acid, and phosphazene, upon polymerization, are found to be essentially non-flammable. Good examples include diethyl vinylphosphonate, dimethyl vinylphosphonate, vinylphosphonic acid, diethyl allyl phosphate, and diethyl allylphosphonate:

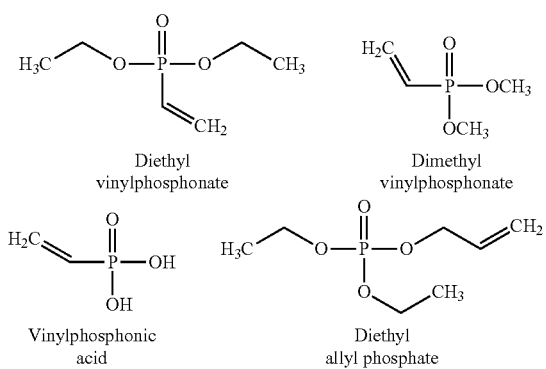

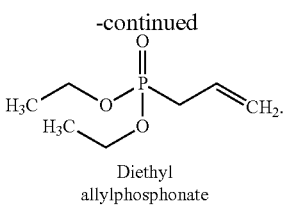

Examples of initiator compounds that can be used in the polymerization of vinylphosphonic acid are peroxides such as benzoyl peroxide, toluyl peroxide, di-tert.butyl peroxide, chloro benzoyl peroxide, or hydroperoxides such as methylethyl ketone peroxide, tert, butyl hydroperoxide, cumene hydroperoxide, hydrogen Superoxide, or azo-bis-iso-butyro nitrile, or sulfinic acids such as p-methoxyphenyl-sulfinic acid, isoamyl-sulfinic acid, benzene-sulfinic acid, or combinations of various of such catalysts with one another and/or combinations for example, with formaldehyde sodium sulfoxylate or with alkali metal sulfites.

The siloxane or silane may be selected from alkylsiloxane (Si—O), alkyylsilane (Si—C), liquid oligomeric silaxane (—Si—O—Si—), or a combination thereof.

The reactive additive or reactive liquid electrolyte may further comprise an amide group selected from N,N-dimethylacetamide, N,N-diethylacetamide, N,N-dimethylformamide, N,N-diethylformamide, or a combination thereof.

In certain embodiments, the crosslinking agent comprises a compound having at least one reactive group selected from a hydroxyl group, an amino group, an imino group, an amide group, an acrylic amide group, an amine group, an acrylic group, an acrylic ester group, or a mercapto group in the molecule.

In certain embodiments, the crosslinking agent is selected from poly(diethanol) diacrylate, poly(ethyleneglycol)dimethacrylate, poly(diethanol) dimethylacrylate, poly(ethylene glycol) diacrylate, lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium oxalyldifluoroborate (LiBF$_2$C$_2$O$_4$), or a combination thereof.

The initiator may be selected from an azo compound (e.g., azodiisobutyronitrile, AIBN), azobisisobutyronitrile, azobisisoheptonitrile, dimethyl azobisisobutyrate, benzoyl peroxide tert-butyl peroxide and methyl ethyl ketone peroxide, benzoyl peroxide (BPO), bis(4-tert-butylcyclohexyl)peroxydicarbonate, t-amyl peroxypivalate, 2,2'-azobis-(2,4-dimethylvaleronitrile), 2,2'-azobis-(2-methylbutyronitrile), 1,1-azobis(cyclohexane-1-carbonitrile, benzoylperoxide (BPO), hydrogen peroxide, dodecamoyl peroxide, isobutyryl peroxide, cumene hydroperoxide, tert-butyl peroxypivalate, diisopropyl peroxydicarbonate, or a combination thereof.

In the disclosed polymer electrolyte, the lithium salt may be selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoromethanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphates (LiPF$_3$(CF$_2$CF$_3$)$_3$), lithium bisperfluoro-ethylsulfonylimide (Li-BETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

The crosslinking agent preferably comprises a compound having at least one reactive group selected from a hydroxyl group, an amino group, an imino group, an amide group, an amine group, an acrylic group, or a mercapto group in the molecule. The amine group is preferably selected from Chemical Formula 2:

(Chemical Formula 2)

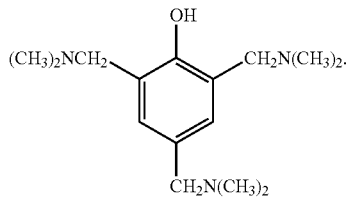

In the bipolar electrode or the bipolar lithium battery, the reactive additive may further comprise a chemical species represented by Chemical Formula 3 or a derivative thereof and the crosslinking agent comprises a chemical species represented by Chemical Formula 4 or a derivative thereof:

(Chemical Formula 3)

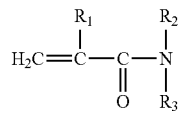

(Chemical Formula 4)

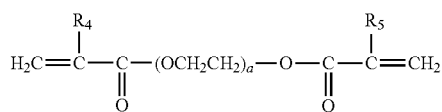

where $R_1$ is hydrogen or methyl group, and $R_2$ and $R_3$ are each independently one selected from the group consisting of hydrogen, methyl, ethyl, propyl, dialkylaminopropyl (—$C_3H_6N(R')_2$) and hydroxyethyl ($CH_2CH_2OH$) groups, and $R_4$ and $R_5$ are each independently hydrogen or methyl group, and n is an integer from 3 to 30, wherein R' is $C_1$~$C_5$ alkyl group.

Examples of suitable vinyl monomers having Chemical formula 3 include acrylamide, N,N-dimethylacrylamide, N,N-diethylacrylamide, N-isopropylacrylamide, N,N-dimethylamino-propylacrylamide, and N-acryloylmorpholine. Among these species, N-isopropylacrylamide and N-acryloylmorpholine are preferred.

The crosslinking agent is preferably selected from N,N-methylene bisacrylamide, epichlorohydrin, 1,4-butanediol diglycidyl ether, tetrabutylammonium hydroxide, cinnamic acid, ferric chloride, aluminum sulfate octadecahydrate, diepoxy, dicarboxylic acid compound, poly(potassium 1-hydroxy acrylate) (PKHA), glycerol diglycidyl ether (GDE), ethylene glycol, polyethylene glycol, polyethylene glycol diglycidyl ether (PEGDE), citric acid (Formula 4 below), acrylic acid, methacrylic acid, a derivative compound of acrylic acid, a derivative compound of methacrylic acid (e.g. polyhydroxyethylmethacrylate), glycidyl functions, N,N'-Methylenebisacrylamide (MBAAm), Ethylene glycol dimethacrylate (EGDMAAm), isobornyl methacrylate, poly (acrylic acid) (PAA), methyl methacrylate, isobornyl acrylate, ethyl methacrylate, isobutyl methacrylate, n-Butyl methacrylate, ethyl acrylate, 2-Ethyl hexyl acrylate, n-Butyl acrylate, a diisocyanate (e.g. methylene diphenyl diisocyanate, MDI), an urethane chain, a chemical derivative thereof, or a combination thereof.

The polymer in the electrolyte may form a mixture, copolymer, semi-interpenetrating network, or simultaneous interpenetrating network with a second polymer selected from poly(ethylene oxide), polypropylene oxide, poly(ethylene glycol), poly(acrylonitrile), poly(methyl methacrylate), poly(vinylidene fluoride), poly bis-methoxy ethoxyethoxide-phosphazenex, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol) diacrylate or poly(ethylene glycol) methyl ether acrylate, a sulfonated derivative thereof, or a combination thereof. One or more of these polymers may be pre-mixed into the anode and/or the cathode prior to assembling the electrodes and other components into a dry cell.

In certain desirable embodiments, the electrolyte further comprises particles of an inorganic solid electrolyte material having a particle size from 2 nm to 30 μm, wherein the particles of inorganic solid electrolyte material are dispersed in the polymer or chemically bonded by the polymer. The particles of inorganic solid electrolyte material are preferably selected from an oxide type, sulfide type, hydride type, halide type, borate type, phosphate type, lithium phosphorus oxynitride (LiPON), garnet-type, lithium superionic conductor (LISICON) type, sodium superionic conductor (NASICON) type, or a combination thereof.

The inorganic solid electrolytes that can be incorporated into the electrolyte include, but are not limited to, perovskite-type, NASICON-type, garnet-type and sulfide-type materials. A representative and well-known perovskite solid electrolyte is $Li_{3x}La_{2/3-x}TiO_3$, which exhibits a lithium-ion conductivity exceeding $10^{-3}$ S/cm at room temperature. This material has been deemed unsuitable in lithium batteries because of the reduction of $Ti^{4+}$ on contact with lithium metal. However, we have found that this material, when dispersed in an elastic polymer, does not suffer from this problem.

The sodium superionic conductor (NASICON)-type compounds include a well-known $Na_{1+x}Zr_2Si_xP_{3-x}O_{12}$. These materials generally have an $AM_2(PO_4)_3$ formula with the A site occupied by Li, Na or K. The M site is usually occupied by Ge, Zr or Ti. In particular, the $LiTi_2(PO_4)_3$ system has been widely studied as a solid state electrolyte for the lithium-ion battery. The ionic conductivity of $LiZr_2(PO_4)_3$ is very low, but can be improved by the substitution of Hf or Sn. This can be further enhanced with substitution to form $Li_{1+x}M_xTi_{2-x}(PO_4)_3$ (M=Al, Cr, Ga, Fe, Sc, In, Lu, Y or La). Al substitution has been demonstrated to be the most effective solid state electrolyte. The $Li_{1+x}Al_xGe_{2-x}(PO_4)_3$ system is also an effective solid state due to its relatively wide electrochemical stability window. NASICON-type materials are considered as suitable solid electrolytes for high-voltage solid electrolyte batteries.

Garnet-type materials have the general formula $A_3B_2Si_3O_{12}$, in which the A and B cations have eightfold and sixfold coordination, respectively. In addition to $Li_3M_2Ln_3O_{12}$ (M=W or Te), a broad series of garnet-type materials may be used as an additive, including $Li_5La_3M_2O_{12}$ (M=Nb or Ta), $Li_6ALa_2M_2O_{12}$ (A=Ca, Sr or Ba; M=Nb or Ta), $Li_{5.5}La_3M_{1.75}B_{0.25}O_{12}$ (M=Nb or Ta; B=In or Zr) and the cubic systems $Li_7La_3Zr_2O_{12}$ and $Li_{7.06}M_3Y_{0.06}Zr_{1.94}O_{12}$ (M=La, Nb or Ta). The $Li_{6.5}La_3Zr_{1.75}Te_{0.25}O_{12}$ compounds have a high ionic conductivity of $1.02\times10^{-3}$ S/cm at room temperature.

The sulfide-type solid electrolytes include the $Li_2S$—$SiS_2$ system. The highest reported conductivity in this type of material is $6.9\times10^{-4}$ S/cm, which was achieved by doping the $Li_2S$—$SiS_2$ system with $Li_3PO_4$. The sulfide type also includes a class of thio-LISICON (lithium superionic conductor) crystalline material represented by the $Li_2S$—$P_2S_5$ system. The chemical stability of the $Li_2S$—$P_2S_5$ system is considered as poor, and the material is sensitive to moisture (generating gaseous $H_2S$). The stability can be improved by the addition of metal oxides. The stability is also significantly improved if the $Li_2S$—$P_2S_5$ material is dispersed in an elastic polymer.

These solid electrolyte particles dispersed in an electrolyte polymer can help enhance the lithium ion conductivity of certain polymers having an intrinsically low ion conductivity.

Preferably and typically, the polymer has a lithium ion conductivity no less than $10^{-5}$ S/cm, more preferably no less than $10^{-4}$ S/cm, and further preferably no less than $10^{-3}$ S/cm.

The disclosed dipolar lithium battery can be a lithium-ion battery or a lithium metal battery, the latter having lithium metal as the primary anode active material. The lithium metal battery can have lithium metal implemented at the anode when the battery is made. Alternatively, the lithium may be stored in the cathode active material and the anode side is lithium metal-free initially. This is called an anode-less lithium metal battery.

As illustrated in FIG. 3(A), the bipolar anode-less lithium battery is in an as-manufactured or fully discharged state according to certain embodiments of the present disclosure. The battery comprises multiple cells, wherein a cell comprises a separator (e.g., 15a, 15b), a cathode layer (e.g., 16a, 16b) supported on a bipolar current collector (e.g., 18a, 18b), and a neighboring bipolar current collector (e.g., 18b, 18c) having one primary surface (the anode side) initially being free from any lithium metal. Each cathode layer comprises a cathode active material, a conductive additive (not shown), an optional resin binder (not shown), and an electrolyte (dispersed in the entire cathode layer and in contact with the cathode active material). The bipolar current collector (18a, 18b, 18c) supports the cathode layer (16a, 16b) on a primary surface with the opposing primary surface being tentatively free from a lithium metal layer (as manufactured or in a fully discharged state). There is no lithium metal in the anode side of a bipolar current collector when the battery is manufactured.

In a charged state, as illustrated in FIG. 3(B), the battery cell comprises a lithium metal (20a, 20b) plated on the opposing primary surface (the anode side) of a bipolar current collector (18b, 18c), a separator (15a, 15b), and a cathode layer (16a, 16b). The lithium metal comes from the cathode active material (e.g., $LiCoO_2$ and $LiMn_2O_4$) that contains Li element when the cathode is made. During a charging step, lithium ions are released from the cathode active material and move to the anode side to deposit onto a primary surface of a bipolar current collector for forming a lithium metal layer, the anode active material.

One unique feature of the presently disclosed bipolar anode-less lithium battery is the notion that there is substantially no anode active material and no lithium metal is present when the battery is made. The commonly used anode active material, such as an intercalation type anode material (e.g., graphite, carbon particles, Si, SiO, Sn, $SnO_2$, Ge, etc.), P, or any conversion-type anode material, is not included in the battery. The anode only contains a current collector or a protected current collector. No lithium metal (e.g., Li particle, surface-stabilized Li particle, Li foil, Li chip, etc.) is present in the anode when the battery is made; lithium is basically stored in the cathode (e.g., Li element in $LiCoO_2$, $LiMn_2O_4$, lithium iron phosphate, lithium polysulfides, lithium polyselenides, NCA, NCM, etc.). During the first charge procedure after the battery is sealed in a housing (e.g., a stainless steel hollow cylinder or an Al/plastic laminated envelop), lithium ions are released from these Li-containing compounds (cathode active materials) in the cathode, travel through the electrolyte/separator into the anode side, and get deposited on the surface of a bipolar current collector. During a subsequent discharge procedure, lithium ions leave this surface and travel back to the cathode, intercalating or inserting into the cathode active material.

Such an anode-less bipolar battery is much simpler and more cost-effective to produce as compared to the conventional lithium-ion battery since there is no need to have a layer of anode active material (e.g., graphite particles, along with a conductive additive and a binder) pre-coated on the Cu foil surfaces via the conventional slurry coating and drying procedures. The anode materials and anode active layer manufacturing costs can be saved. Furthermore, since there is no anode active material layer (otherwise typically 40-200 μm thick), the weight and volume of the cell can be significantly reduced, thereby increasing the gravimetric and volumetric energy density of the battery. This advantage is in addition to the advantage that there are substantially no connecting wires or cables between two unit cells, further saving the weight, volume, and cost.

Another important advantage of the anode-less battery is the notion that there is no lithium metal in the anode when a lithium metal cell is made. Lithium metal (e.g., Li metal foil and particles) is highly sensitive to air moisture and oxygen and notoriously known for its difficulty and danger to handle during manufacturing of a Li metal battery. The manufacturing facilities should be equipped with special class of dry rooms, which are expensive and significantly increase the battery cell costs.

The primary surface at the anode side of a bipolar current collector may be is deposited with multiple particles or coating of a lithium-attracting metal (lithiophilic metal), wherein the lithium-attracting metal, preferably having a diameter or thickness from 1 nm to 10 μm, is selected from Au, Ag, Mg, Zn, Ti, K, Al, Fe, Mn, Co, Ni, Sn, V, Cr, an alloy thereof, or a combination thereof. This deposited metal layer may be further deposited with a layer of protective polymer that covers and protects the multiple particles or coating of the lithiophilic metal. Alternatively, the lithiophilic metal may be protected by a graphene layer that comprises graphene balls and/or graphene foam. Preferably, the graphene layer has a thickness from 1 nm to 50 μm and/or has a specific surface area from 5 to 1000 $m^2/g$ (more preferably from 10 to 500 $m^2/g$). It may be noted that this protective graphene layer (for protecting the lithiophilic metal) is separate and different from the graphene or expanded graphite layer that is directly deposited onto the primary surfaces of a bipolar current collector to prevent diffusion of lithium ions through the metal foil; this graphene layer is further discussed below:

A bipolar current collector may be coated with a graphene or expanded graphite layer on one primary surface or both primary surfaces to protect against diffusion of lithium ions into the current collector (e.g., a metal foil). This graphene layer may comprise a graphene layer produced via chemical vapor deposition (CVD). The graphene layer may comprise graphene sheets selected from single-layer or few-layer graphene, wherein the few-layer graphene sheets are commonly defined to have 2-10 layers of stacked graphene planes having an inter-plane spacing $d_{002}$ from 0.3354 nm to 0.6 nm as measured by X-ray diffraction. The single-layer or few-layer graphene sheets may contain a pristine graphene material having essentially zero % of non-carbon elements, or a non-pristine graphene material having 0.001% to 45% by weight of non-carbon elements. The non-pristine graphene may be selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

For a bipolar lithium-ion battery featuring the presently disclosed electrolyte, there is no particular restriction on the selection of an anode active material. The anode active material may be selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobate, lithium-containing titanium oxide, lithium transition metal oxide, $ZnCo_2O_4$; (f) carbon or graphite particles (g) prelithiated versions thereof; and (h) combinations thereof.

A highly significant observation is that the polymer derived (polymerized) from an otherwise volatile solvent (monomer) can dramatically curtail the amount of volatile solvent molecules that can escape into the vapor phase in a thermodynamic equilibrium condition. In many cases, this has effectively prevented any flammable gas molecules from initiating a flame even at an extremely high temperature. The flash point of the quasi-solid or solid-state electrolyte is typically at least 100 degrees (often >150 degrees) higher than the flash point of the neat organic solvent without polymerization. In most of the cases, either the flash point is significantly higher than 200° C. or no flash point can be detected. The electrolyte just would not catch on fire. Furthermore, any accidentally initiated flame does not sustain for longer than 3 seconds. This is a highly significant discovery, considering the notion that fire and explosion concern has been a major impediment to widespread acceptance of battery-powered electric vehicles. This new technology could significantly impact the emergence of a vibrant EV industry.

In addition to the non-flammability and high lithium ion transference numbers, there are several additional benefits associated with using the presently disclosed quasi-solid or solid-state electrolytes. As one example, these electrolytes can significantly enhance cycling and safety performance of rechargeable lithium batteries through effective suppression of lithium dendrite growth. Due to a good contact between the electrolyte and an electrode, the interfacial impedance can be significantly reduced. Additionally, the local high viscosity induced by the presence of a polymer in the anode can increase the pressure from the electrolyte to inhibit dendrite growth, potentially resulting in a more uniform deposition of lithium ions on the surface of the anode. The high viscosity could also limit anion convection near the deposition area, promoting more uniform deposition of Li ions. These reasons, separately or in combination, are believed to be responsible for the notion that no dendrite-like feature has been observed with any of the large number of rechargeable lithium cells that we have investigated thus far.

As another benefit example, this electrolyte is capable of inhibiting lithium polysulfide dissolution at the cathode and migration to the anode of a Li—S cell, thus overcoming the polysulfide shuttle phenomenon and allowing the cell capacity not to decay significantly with time. Consequently, a coulombic efficiency nearing 100% along with long cycle life can be achieved. When a concentrated electrolyte or crosslinked polymer is used, the solubility of lithium polysulfide will be reduced significantly.

The lithium salt may be selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethylsulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

The ionic liquid is composed of ions only. Ionic liquids are low melting temperature salts that are in a molten or liquid state when above a desired temperature. For instance, an ionic salt is considered as an ionic liquid if its melting point is below 100° C. If the melting temperature is equal to or lower than room temperature (25° C.), the salt is referred to as a room temperature ionic liquid (RTIL). The IL-based lithium salts are characterized by weak interactions, due to the combination of a large cation and a charge-delocalized anion. This results in a low tendency to crystallize due to flexibility (anion) and asymmetry (cation).

Some ILs may be used as a co-solvent (not as a salt) to work with the first organic solvent of the present invention. A well-known ionic liquid is formed by the combination of a 1-ethyl-3-methyl-imidazolium (EMI) cation and an N,N-bis(trifluoromethane)sulphonamide (TFSI) anion. This combination gives a fluid with an ionic conductivity comparable to many organic electrolyte solutions, a low decomposition propensity and low vapor pressure up to ~300-400° C. This implies a generally low volatility and non-flammability and, hence, a much safer electrolyte solvent for batteries.

Ionic liquids are basically composed of organic or inorganic ions that come in an unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide and hexafluorophosphate as anions. Useful ionic liquid-based lithium salts (not solvent) may be composed of lithium ions as the cation and bis(trifluoromethanesulphonyl)imide, bis(fluorosulphonyl)imide and hexafluorophosphate as anions. For instance, lithium trifluoromethanesulfonimide (LiTFSI) is a particularly useful lithium salt.

Based on their compositions, ionic liquids come in different classes that include three basic types: aprotic, protic and zwitterionic types, each one suitable for a specific application. Common cations of room temperature ionic liquids (RTILs) include, but are not limited to, tetraalkylammonium, di, tri, and tetra-alkylimidazolium, alkylpyridinium, dialkyl-pyrrolidinium, dialkylpiperidinium, tetraalkylphosphonium, and trialkylsulfonium. Common anions of RTILs include, but are not limited to, $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2,3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2)_2^-$, or $F(HF)_{2,3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte co-solvent in a rechargeable lithium cell.

There is also no restriction on the type of the cathode materials that can be used in practicing the present disclosure. For Li—S cells, the cathode active material may contain lithium polysulfide or sulfur. If the cathode active material includes lithium-containing species (e.g., lithium polysulfide) when the cell is made, there is no need to have a lithium metal pre-implemented in the anode.

There are no particular restrictions on the types of cathode active materials that can be used in the presently disclosed lithium battery, which can be a primary battery or a secondary battery. The rechargeable lithium metal or lithium-ion cell may preferably contain a cathode active material selected from, as examples, a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In a rechargeable lithium cell, the cathode active material may be selected from a metal oxide, a metal oxide-free inorganic material, an organic material, a polymeric material, sulfur, lithium polysulfide, selenium, or a combination thereof. The metal oxide-free inorganic material may be selected from a transition metal fluoride, a transition metal chloride, a transition metal dichalcogenide, a transition metal trichalcogenide, or a combination thereof. In a particularly useful embodiment, the cathode active material is selected from $FeF_3$, $FeCl_3$, $CuCl_2$, $TiS_2$, $TaS_2$, $MoS_2$, $NbSe_3$, $MnO_2$, $CoO_2$, an iron oxide, a vanadium oxide, or a combination thereof, if the anode contains lithium metal as the anode active material. The vanadium oxide may be preferably selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1<x<5$. For those cathode active materials containing no Li element therein, there should be a lithium source implemented in the cathode side to begin with. This can be any compound that contains a high lithium content, or a lithium metal alloy, etc.

In a rechargeable lithium cell (e.g., the lithium-ion battery cell), the cathode active material may be selected to contain a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

Particularly desirable cathode active materials comprise lithium nickel manganese oxide ($LiNi_aMn_{2-a}O_4$, $0<a<2$), lithium nickel manganese cobalt oxide (NCM or $LiNi_nMn_mCo_{1-n-m}O_2$, $0<n<1$, $0<m<1$, $n+m<1$), lithium nickel cobalt aluminum oxide (NCA or $LiNi_cCo_dAl_{1-c-d}O_2$, $0<c<1$, $0<d<1$, $c+d<1$), lithium manganate ($LiMn_2O_4$), lithium iron phosphate ($LiFePO_4$), lithium manganese oxide ($LiMnO_2$), lithium cobalt oxide ($LiCoO_2$), lithium nickel cobalt oxide ($LiNi_pCo_{1-p}O_2$, $0<p<1$), or lithium nickel manganese oxide ($LiNi_qMn_{2-q}O_4$, $0<q<2$).

In a preferred lithium metal secondary battery, the cathode active material preferably contains an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof. Again, for those cathode active materials containing no Li element therein, there should be a lithium source implemented in the cathode side to begin with.

In another preferred bipolar rechargeable lithium battery (e.g. a lithium metal secondary battery or a lithium-ion battery), the cathode active material contains an organic material or polymeric material selected from Poly(anthraquinonyl sulfide) (PAQS), lithium oxocarbons (including squarate, croconate, and rhodizonate lithium salts), oxacarbon (including quinines, acid anhydride, and nitrocompound), 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material (redox-active structures based on multiple adjacent carbonyl groups (e.g., "$C_6O_6$"-type structure, oxocarbons), Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([$(NPS_2)_3$]n), lithiated 1,4,5,8-naphthalenetetraol formaldehyde polymer, Hexaazatrinaphtylene (HATN), Hexaazatriphenylene hexacarbonitrile (HAT(CN)6), 5-Benzylidene hydantoin, Isatine lithium salt, Pyromellitic diimide lithium salt, tetrahydroxy-p-benzoquinone derivatives ($THQLi_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

The thioether polymer may be selected from Poly[methanetetryl-tetra(thiomethylene)] (PMTTM), Poly(2,4-dithiopentanylene) (PDTP), or Poly(ethene-1,1,2,2-tetrathiol) (PETT) as a main-chain thioether polymer, in which sulfur atoms link carbon atoms to form a polymeric backbones. The side-chain thioether polymers have polymeric main-chains that include conjugating aromatic moieties, but having thioether side chains as pendants. Among them Poly(2-phenyl-1,3-dithiolane) (PPDT), Poly(1,4-di(1,3-dithiolan-2-yl)benzene) (PDDTB), poly(tetrahydrobenzodithiophene) (PTHBDT), and poly[1,2,4,5-tetrakis(propylthio)benzene] (PTKPTB) have a polyphenylene main chain, linking thiolane on benzene moieties as pendants. Similarly, poly[3,4 (ethylenedithio)thiophene] (PEDTT) has polythiophene backbone, linking cyclo-thiolane on the 3,4-position of the thiophene ring.

In yet another preferred bipolar rechargeable lithium battery, the cathode active material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof. This class of lithium secondary batteries has a high capacity and high energy density. Again, for those cathode active materials containing no Li element therein, there should be a lithium source implemented in the cathode side to begin with.

Figure 2A:
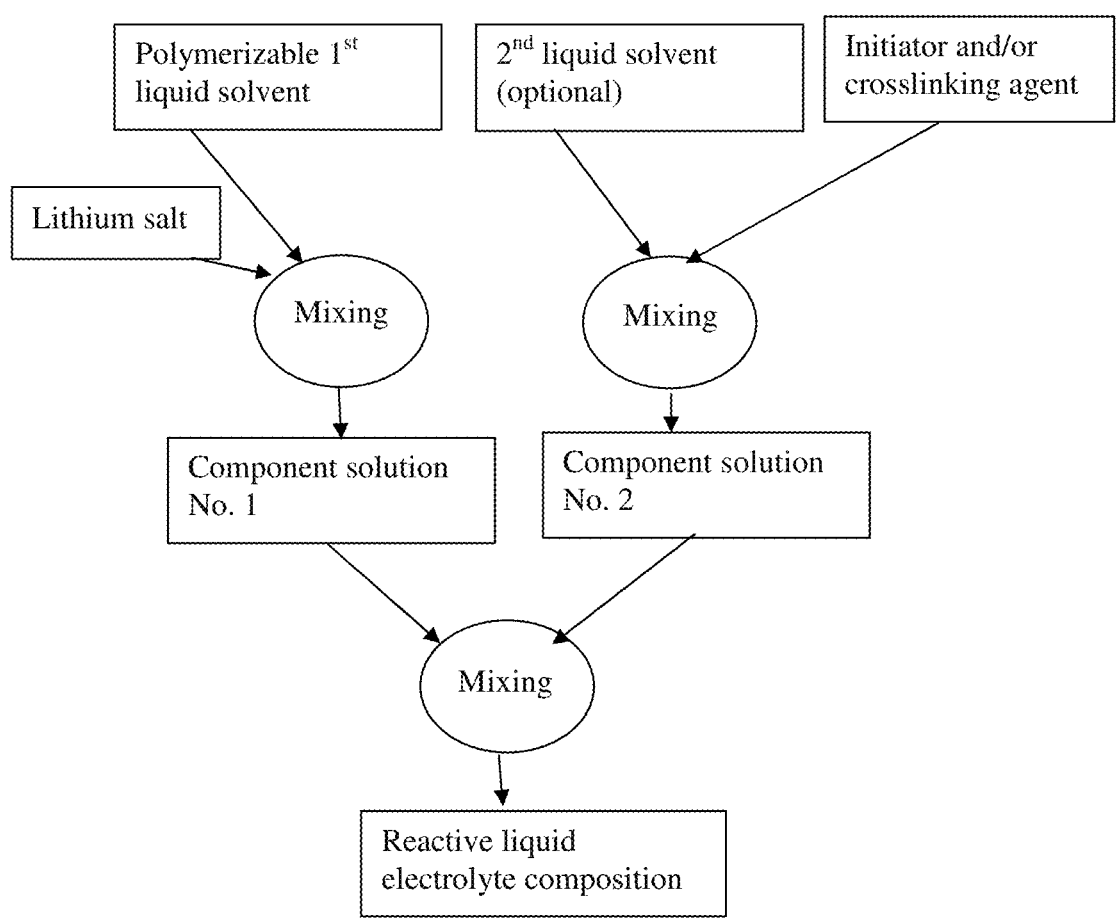
FIG. 2(A) A process flow chart to illustrate the method of producing a reactive electrolyte composition according to some embodiments of the present disclosure.

As illustrated in FIG. 2(A), the present disclosure provides an active electrolyte composition comprising: (a) a first solution, comprising at least a polymerizable first liquid solvent; and (b) a second solution, comprising an initiator and/or crosslinking agent, a lithium salt, and a second non-aqueous liquid solvent (e.g., an organic solvent or ionic liquid solvent); wherein the first solution and the second solution are stored separately before the first solution and the second solution are mixed to form the electrolyte. The first liquid solvent is polymerizable and has a lower flash point (higher flammability), a higher vapor pressure, a higher dielectric constant, or a higher solubility of the lithium salt as compared with the second liquid solvent. Actually, the lithium salt may be dissolved in the first solvent, the second solvent, or both.

Figure 2B:
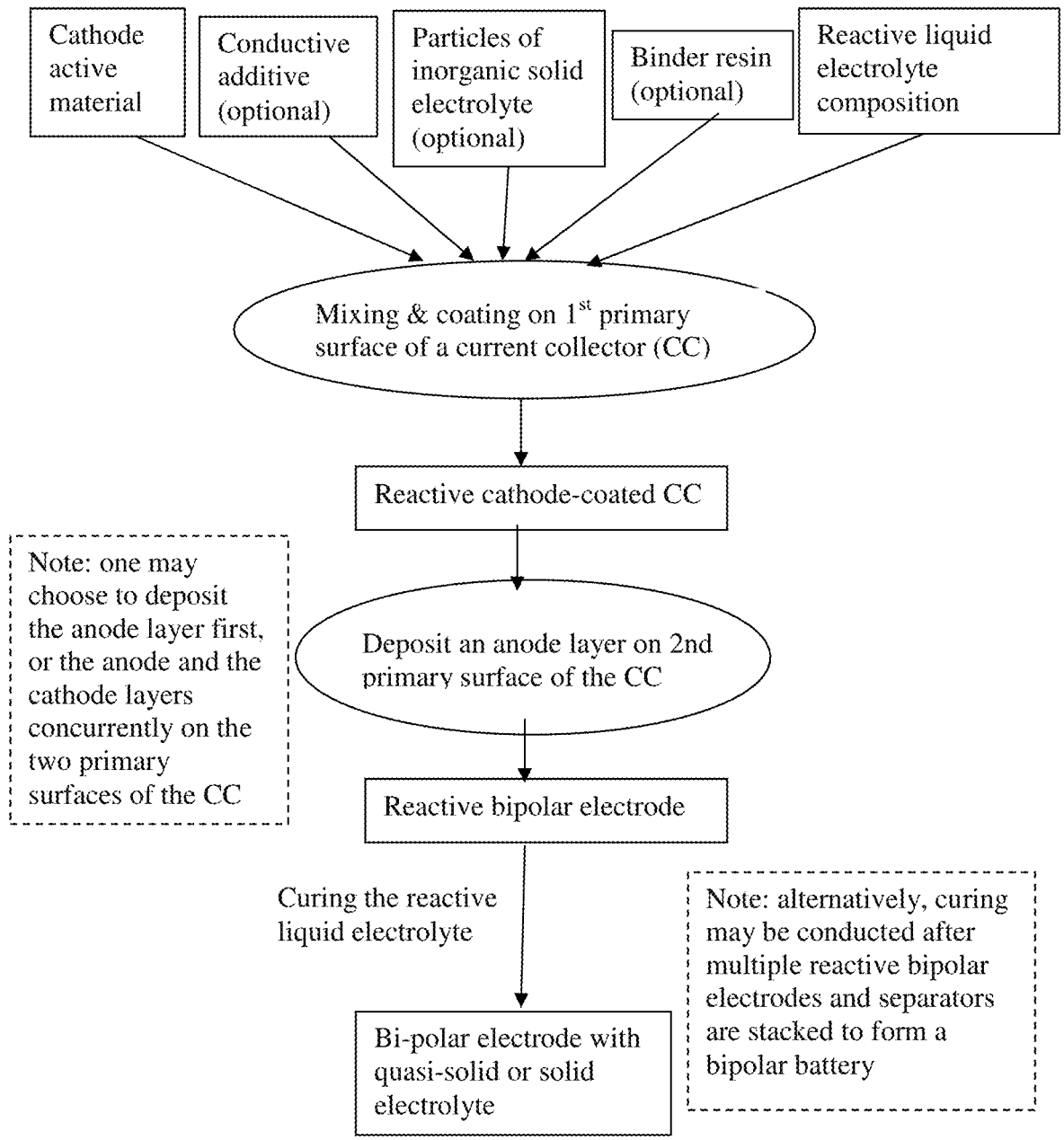
FIG. 2(B) A process flow chart to illustrate a method of producing a bipolar electrode and the resultant bipolar lithium metal battery comprising a substantially solid-state electrolyte according to some embodiments of the present disclosure.

The present disclosure also provides a method of producing the disclosed bipolar electrode, as illustrated in FIG. 2(B). In certain embodiments, the method comprises: (a) providing a current collector comprising a conductive material foil having a thickness from 10 nm to 100 μm and two (substantially parallel) opposing primary surfaces, wherein one or both of the primary surfaces is optionally coated with a layer of graphene or expanded graphite material having a thickness from 5 nm to 50 μm; (b) depositing a reactive cathode layer onto a first primary surface of a current collector to form a reactive cathode layer-coated current collector, wherein the reactive cathode layer comprises a mixture of multiple particles of a cathode active material, a conductive additive, and a reactive liquid electrolyte composition comprising at least a polymerizable first liquid solvent, a lithium salt dissolved in the first liquid solvent, and a crosslinking agent and/or an initiator, wherein the first liquid solvent occupies from 1% to 99% by weight based on the total weight of the reactive liquid electrolyte composition; and (c) partially or totally polymerizing or crosslinking the first liquid solvent to obtain a cathode active layer-coated current collector wherein from 30% to 100% by weight of the polymerizable first liquid solvent is polymerized or crosslinked to become a quasi-solid or solid-state electrolyte that chemically bonds the multiple particles of the cathode active material and the conductive additive together to form a cathode active layer that adheres to the first primary surface.

The reactive liquid electrolyte may further comprise from 1% to 90% by weight of a second liquid solvent and the first liquid solvent has a lower flash point, a higher vapor pressure, a higher dielectric constant, or a higher solubility of the lithium salt as compared with the second liquid solvent.

The method may further comprise a step (d) of depositing an anode active layer to a second primary surface of the current collector to form the bipolar electrode. In some preferred embodiments, step (d) comprises (i) depositing a reactive anode layer onto the second primary surface of the current collector to form a reactive anode layer-coated, current collector, wherein the reactive anode layer comprises a mixture of multiple particles of an anode active material, a conductive additive, and a reactive liquid electrolyte composition comprising at least a third polymerizable liquid solvent, a lithium sail dissolved in the third liquid solvent, and a crosslinking agent and/or an initiator, wherein the third liquid solvent occupies from 1% to 99% by weight based on the total weight of the reactive liquid electrolyte composition; and (ii) partially or totally polymerizing/crosslinking the third liquid solvent to obtain a cathode active layer-coated current collector wherein from 30% to 100% by weight of the polymerizable first liquid solvent is polymerized/crosslinked to become a quasi-solid or solid-state electrolyte that chemically bonds the multiple particles of the anode active material and the conductive additive together to form an anode active layer that adheres to the second primary surface.

The reactive liquid electrolyte composition in the reactive anode layer may further comprise from 1% to 99% of a second liquid solvent, wherein the third liquid solvent has a lower flash point, a higher vapor pressure, a higher dielectric constant, or a higher solubility of the lithium salt as compared with the second liquid solvent.

Preferably, the process is a roll-to-roll process wherein the process comprises (i) continuously feeding a layer of the solid substrate (e.g. graphene-coated Al foil) from a feeder roller to a dispensing zone where the reactive mass (e.g., mixture of a reactive electrolyte composition, cathode active material particles, and conductive filler) is dispensed and deposited onto a primary surface of the solid substrate to form a continuous layer of the reactive mass; (ii) moving the layer of the reactive mass into a reacting zone where the reactive mass is exposed to heat, ultraviolet (UV) light, or high-energy radiation to polymerize and/or cure the reactive mass to form a continuous layer of electrode-coated current collector; (iii) depositing an anode layer onto the opposing primary surface (cathode or anode) to form the bipolar electrode; and (iv) collecting the bipolar electrode on a winding roller. This process is conducted in a reel-to-reel manner.

Figure 4:
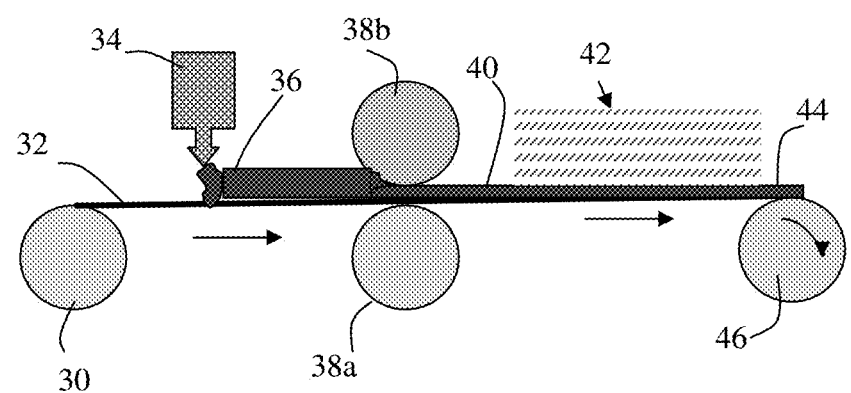
FIG. 4 Schematic of a process to produce a roll of bipolar electrode in a roll-to-roll or reel-to-reel manner according to some embodiments of the present disclosure.

In certain embodiments, as illustrated in FIG. 4, the roll-to-roll process may begin with continuously feeding a solid substrate layer 32 (e.g., graphene- or expanded graphite-coated Al foil) from a feeder roller 30. A dispensing device 34 is operated to dispense and deposit a reactive mass 36 (e.g., reactive cathode layer) onto the solid substrate layer 32, which is driven toward a pair of rollers (38a, 38b). These rollers are an example of a provision to regulate or control the thickness of the reactive mass 40. The reactive mass 40, supported on the solid substrate, is driven to move through a reacting zone 42 which is provided with a curing means (heat, UV, high energy radiation, etc.). The partially or fully cured polymer composite 44 is collected on a winding roller 46. An anode layer may be deposited before or after the cathode layer is cured so that the anode layer may be cured concurrently or separately. The anode layer may be just a layer of lithium metal or a lithium metal-protecting polymer that can be deposited using vapor deposition, sputtering, spraying, etc. One may unwind the roll at a later stage.

The process may further comprise cutting and trimming the continuous layer of bipolar electrode into one or multiple pieces of bipolar electrodes. The process may further comprise combining multiple bipolar electrodes and separators into a bipolar lithium battery.

Figure 2C:
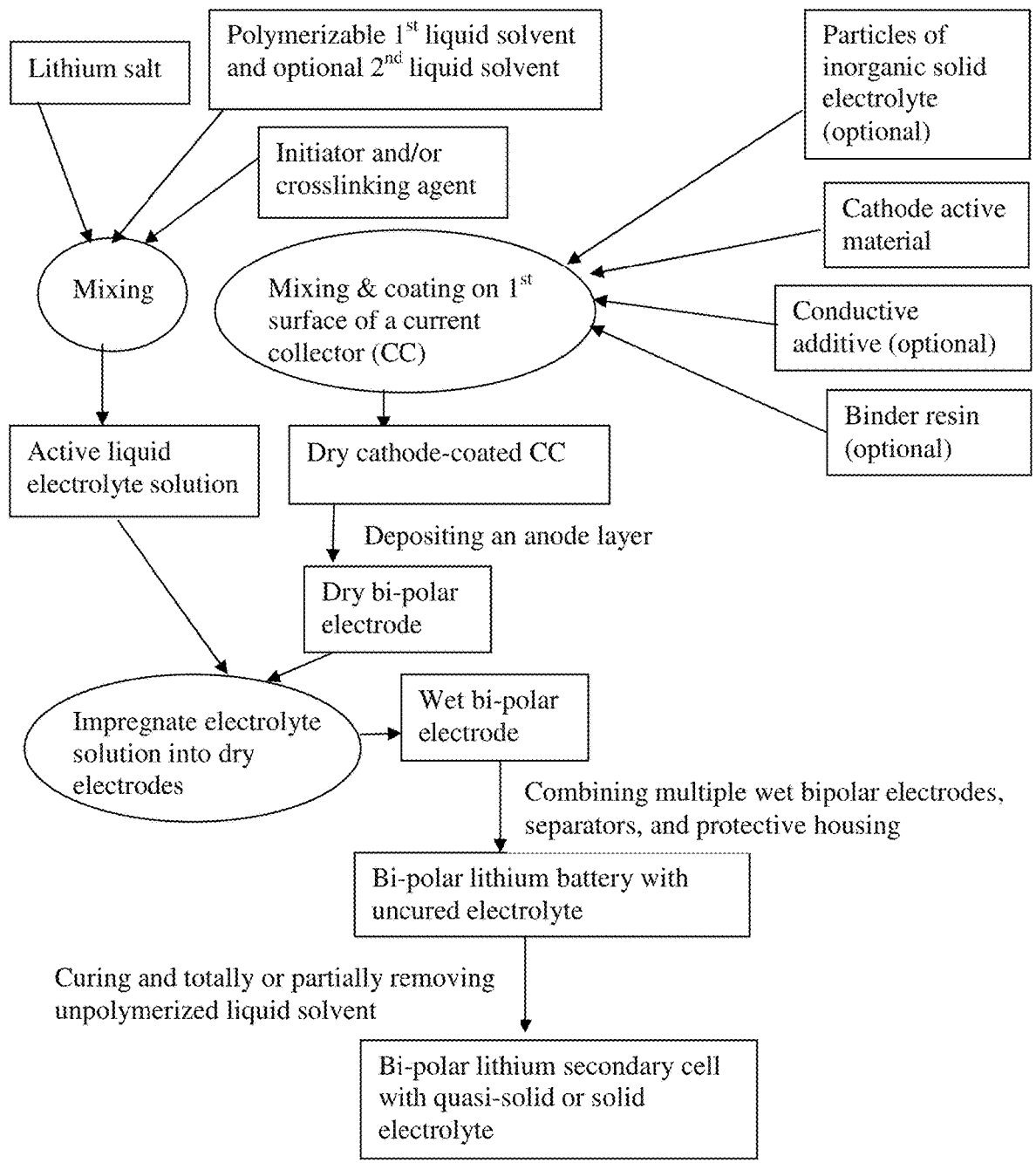
FIG. 2(C) A process flow chart to illustrate a method of producing a bipolar electrode and a bipolar lithium metal battery comprising a substantially solid-state electrolyte according to some embodiments of the present disclosure.

The disclosure further provides a method of producing a bipolar rechargeable lithium battery (as illustrated in FIG. 2(C)), the method comprising:

(A) mixing particles of a cathode active material, a conductive additive, an optional resin binder, and a reactive liquid electrolyte to form a reactive cathode layer and depositing the reactive cathode layer to a primary surface of a current collector, wherein the reactive additive comprises (i) a first liquid solvent that is polymerizable, (ii) an initiator and/or curing agent, and (iii) a lithium salt dissolved in the first liquid solvent, wherein the cathode active material occupies from 35% to 95% by weight based on the total weight of the reactive cathode layer;

(It may be noted that FIG. 2(C) shows some embodiments wherein particles of a cathode active material, a conductive additive, and a resin binder are combined to form a dry cathode layer via, for instance, the commonly used slurry coating and drying procedure, which is followed by impregnating the dry cathode with the reactive liquid electrolyte just before multiple wet bipolar electrodes are stacked together to form a bipolar battery containing uncured electrolyte. Curing of the liquid electrolyte may occur before or after stacking and assembling to form the bipolar battery.)

(B) mixing particles of an anode active material, a conductive additive, and a reactive liquid electrolyte to form a reactive anode layer and depositing the reactive anode layer to a second primary surface of the current collector, wherein the reactive additive comprises (i) a third liquid solvent that is polymerizable, (ii) an initiator and/or curing agent, and (iii) a lithium salt dissolved in the third liquid solvent, wherein the anode active material occupies from 35% to 95% by weight based on the total weight of the reactive anode layer; and (C) partially or totally polymerizing the first solvent and the third solvent to obtain the bipolar electrode.

In this method, step (A) may be selected from any commonly used cathode production process. For instance, the process may include (i) mixing particles of a cathode active material, a conductive additive, an optional resin binder, optional particles of a solid inorganic electrolyte powder, and an optional flame retardant in a liquid medium (e.g., an organic solvent, such as NMP) to form a slurry; (ii) coating the slurry on a primary surface of a bipolar current collector (e.g., an Al foil) and removing the solvent to form a dry cathode electrode layer; and (iii) impregnating the cathode electrode with a reactive electrolyte liquid. The anode in step (B) may be produced in a similar manner, but using particles of an anode active material (e.g., particles of Si, SiO, Sn, $SnO_2$, graphite, and carbon). The liquid medium used in the production of an anode electrode may be water or an organic solvent. The subsequently dried anode electrode layer is then impregnated with a reactive electrolyte liquid. Curing of the polymerizable solvent(s) can be conducted before or after assembling multiple bipolar electrodes and separators into a bipolar battery.

The following examples are presented primarily for the purpose of illustrating the best mode practice of the present invention, not to be construed as limiting the scope of the present invention. In the present study, the conductive additive in the electrodes was typically selected from carbon black or acetylene black (e.g., Super-P), carbon nanotubes (CNTs), or graphene sheets, unless otherwise specified.

Example 1: Bipolar Lithium Metal Battery Featuring an In Situ Polymerized VC or FEC as the First Liquid Solvent and TEP as a Second Liquid Solvent in a Cathode Layer (0%-70% TEP)

In one example, vinylene carbonate (VC) or fluoroethylene carbonate (FEC) as a first liquid solvent, TEP as a second liquid solvent (flame retardant), and poly(ethylene glycol) diacrylate (PEGDA) as a crosslinking agent were stirred under the protection of argon gas until a homogeneous solution was obtained. The TEP has the following chemical structure:

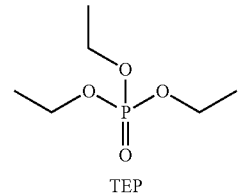

TEP

Subsequently, lithium hexafluoro phosphate, as a lithium salt, was added and dissolved in the above solution to obtain a reactive mixture solution, wherein the weight fractions of VC or FEC, TEP, polyethylene glycol diacrylate, and lithium hexafluoro phosphate were 80 wt %, 5 wt %, 10 wt %, and 5 wt %, respectively.

Particles of $LiCoO_2$, a conductive additive (multi-walled carbon nano-tubes), and one of the above reactive electrolyte solutions were mixed to form a reactive cathode layer, which was coated on one primary surface of a graphene-coated Al foil (a product of Global Graphene Group, Inc., Dayton, Ohio). The reactive electrolyte solution represents 10% by weight based on the total cathode weight. The opposing primary surface of this bipolar current collector was then deposited with a lithium foil to form a bipolar electrode. Layers of a solid-state electrolyte-based separator composed of particles of $Li_7La_3Zr_2O_{12}$ embedded in a polyvinylidene fluoride matrix (inorganic solid electrolyte/PVDF ratio=4/6) were then prepared. Three bipolar electrodes and two separators were then stacked together to form a bipolar lithium battery containing uncured liquid electrolyte.

The bipolar battery was then irradiated with electron beam at room temperature until a total dosage of 40 Gy was reached. In-situ polymerization of the polymerizable first liquid solvent in the battery cell was accomplished, resulting in a quasi-solid electrolyte that permeates into the cathode to wet the surfaces of $LiCoO_2$ particles.

Example 2: VC or FEC as the Polymerizable First Solvent and an Unsaturated Phosphazene as a Second Solvent Similar procedure as in Example 1 was followed, but the second liquid solvent was an unsaturated phosphazene (UPA) having the following structure:

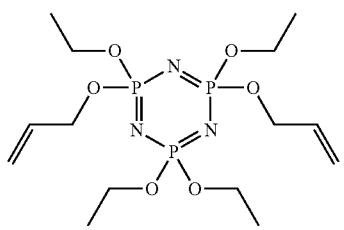 [SMILES: C=CCOP1(OCC)=NP(OCC)(OCC)=NP(OCC)(OCC=C)=N1]

This UPA was synthesized according to a procedure reported by Mason K. Harrup, et al. "Unsaturated phosphazenes as co-solvents for lithium-ion battery electrolytes," Journal of Power Sources 278 (2015) 794-801. The VC/UPA or FEC/UPA ratio was varied as 25/75, 50/50, and 75/25.

Example 3: VC or FEC as the First Liquid Solvent and Trifluoro-Phosphate (TFP) as the Second Liquid Solvent In this study, VC or FEC was used as the first liquid solvent, azodiisobutyronitrile (AIBN) as the initiator, lithium difluoro(oxalate) borate (LiDFOB) as the lithium salt, and TFP as the second flame-retardant liquid solvent. TFP has the following chemical structure:

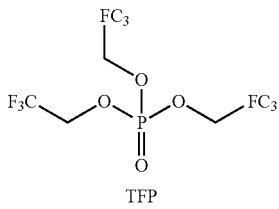

TFP

Solutions containing 1.5 M LiDFOB in VC and FEC, respectively, and 0.2 wt % AIBN (vs VC or FEC) were prepared. Then, TFP (TFP/VC or TFP/EEC ratios being from 10/90 to 50/50) was added into the solution to form mixed electrolyte solutions. The electrolyte solutions were separately injected into different anode and cathode layers of bipolar electrodes (having expanded graphite-coated Al foil current collectors), allowing the electrolyte solution to permeate into the anode (wetting out the anode active material; e.g., graphite particles) and into the cathode (wetting out the cathode active material; e.g., NCM-532 particles). Pieces of a porous separator layer (porous PE/PP film or nonwoven of electro-spun PAN nano-fibers) were soaked and impregnated with this reactive electrolyte solution. Two bipolar electrodes and one soaked separator were then combined to form a bipolar battery. Several bipolar batteries featuring different electrolyte compositions and separators were made. The batteries were stored at 60° C. for 24 h and then 80° C. for another 2 h to obtain polymerized VC or polymerized FEC that contained TFP in their matrix of polymer chains. The polymerization scheme of VC is shown below (Reaction scheme 1):

(Reaction scheme 1)

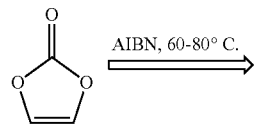

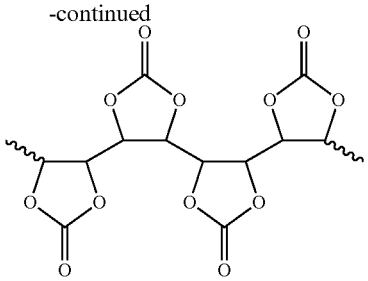

It may be noted that presumably FEC inside the cell may be naturally converted to VC according to the following reaction and the resulting VC can be polymerized according to the following Reaction scheme 2:

(Reaction scheme 2)

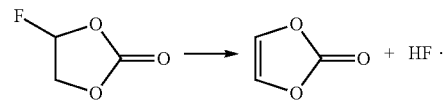

The resultant VC is then polymerized according to Reaction scheme 1 shown above. Presumably, the HF can help form a LiF-rich solid electrolyte interface layer on Li anode or graphite anode material surface for improved cycling performance.

Example 4: Vinyl Ethylene Sulfite (VES) as the First Solvent and Hydrofluoro Ether (HFE) as the Second Solvent Under the protection of an argon gas atmosphere, vinyl ethylene sulfite (VES), hydrofluoro ether (HFE), and tetra (ethylene glycol) diacrylates were stirred evenly to form a solution. Bis trifluoromethyl sulfimide lithium was then dissolved in the solution to obtain a solution mixture. In this solution mixture, the weight fractions for the four ingredients were VEC (40%), HFE (20%), tetra(ethylene glycol) diacrylates (20%), and bis trifluoromethyl sulfimide (10%).

The mixed solution was added to a bipolar lithium-ion battery having four unit cells connected in series; each having an NCM cathode on one primary surface of an expanded graphite-coated Cu foil, a graphite anode on one primary surface of another expanded graphite-coated Cu foil, and a porous PE/PP membrane. These bipolar electrodes and separators were assembled after the mixed solution was injected into the electrodes and soaked into the separator; the mixed solution accounted for 3% of the total battery weight. The battery was exposed to electron beam at 50° C. until a dosage of 20 kGy was reached. VEC was polymerized and crosslinked to become a solid polymer, but HFE remained as a liquid.

Example 5: Lithium-Ion Cell Featuring an In Situ Polymerized Phenyl Vinyl Sulfide (PVS) in the Presence of a Second Solvent TMS (PVS/TMS Ratio=9/1-9/5)

TMS has the following chemical formula:

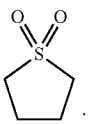

The bipolar lithium-ion batteries prepared in this example each comprise five unit cells. Each bipolar electrode comprises a graphene composite-coated Al as a bipolar current collector. One primary surface of this current collector is coated with an anode layer of meso-carbon micro-beads (MCMB, an artificial graphite supplied from China Steel Chemical Co. Taiwan), and the opposite primary surface coated with a cathode layer of NCM-622 particles. The porous PE/PP membrane impregnated with a reactive liquid electrolyte was used as a separator.

Phenyl vinyl sulfide (first liquid solvent), TMS (second solvent), CTA (chain transfer agent, shown below), AIBN (initiator, 1.0%), and 5% by weight of lithium trifluoromethanesulfonate ($LiCF_3SO_3$), were mixed an injected into the lithium-ion cell, and heated at 60° C. to obtain a battery cell containing an in situ cued polymer electrolyte.

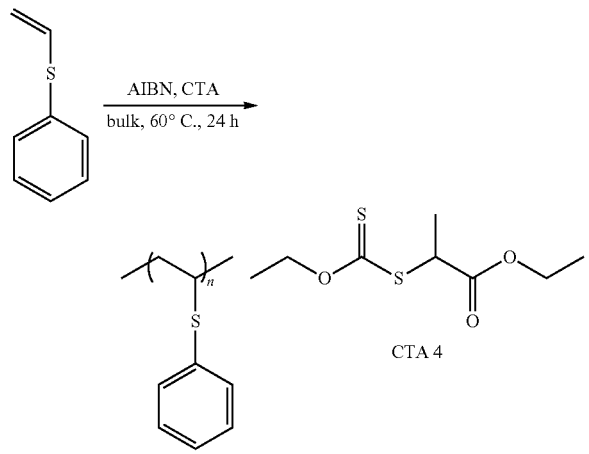

CTA 4

Example 6: Lithium-Ion Bipolar Battery Featuring an In Situ Polymerized Phenyl Vinyl Sulfone The bipolar lithium-ion batteries prepared in this example each comprise 13 unit cells to deliver a battery output voltage of 48 volts. Each unit cell includes an anode layer made of graphene-protected Si particles, a porous PE/PP membrane as a separator, and a cathode of NCM-622 particles.

Phenyl vinyl sulfone (PVS) can be polymerized with several anionic-type initiators; e.g., n-BuLi, ZnEt2, LiN$(CH_2)_2$, and $NaNH_2$. The second solvent may be selected from pyridine, sulfolane, Trimethyl phosphate (TMP), Trifluoro-Phosphate (TFP), etc. Trimethyl phosphate has the following chemical structure:

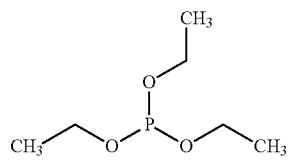

A mixture of PVS, TFP, n-BuLi (1.0% relative to PVS), and $LiBF_4$ (0.5 M) was thoroughly mixed and injected into the electrodes prior to stacking of bipolar electrodes and separators. The bipolar batteries were maintained at 30° C. overnight to cure the PVS solvent.

Example 7: Bipolar Batteries Containing Quasi-Solid and Solid-State Electrolytes from Vinylphosphonic Acid (VPA)

The free radical polymerization of vinylphosphonic acid (VPA) can be catalyzed with benzoyl peroxide as the initiator. In a representative procedure, 150 parts vinylphosphonic acid, 0.75 parts benzoyl peroxide, and 20 parts of lithium bis(oxalato)borate (LiBOB) were dissolved in 150 parts isopropanol. For the preparation of bipolar lithium batteries, dry bipolar electrodes were injected with the reactive mass, followed by removal of most of the isopropanol and, in some cases, replaced with TFP as a second solvent.

In a separate experiment, vinylphosphonic acid was heated to >45° C. (melting point of VPA=36° C.), which was added with benzoyl peroxide, LiBOB, and 25% by weight of a garnet-type solid electrolyte ($Li_7La_3Zr_2O_{12}$ (LLZO) powder). After rigorous stirring, the resulting paste was cast onto a glass surface and cured at 90° C. for 5 hours to form a solid electrolyte separator to be disposed between an anode and a cathode layer. For a bipolar lithium-ion battery, a natural graphite-based anode and a $LiCoO_2$-based cathode were deposited onto the two primary surfaces of an expanded graphite-coated Al foil as a bipolar current collector. For an anode-less lithium battery, a $LiCoO_2$-based cathode layer was deposited on one primary surface of the expanded graphite-coated Al foil, but the opposing primary surface was not deposited with any lithium metal. Multiple (10) bipolar electrodes and 9 solid electrolyte separator layers were assembled into a bipolar battery. The batteries were then heated for 5 hours at 90° C. to form polyvinylphosphonic acid, mixed with 5% by weight TFP.

Electrochemical measurements (CV curves) were carried out in an electrochemical workstation at a scanning rate of 1-100 mV/s. The electrochemical performance of the bipolar batteries were evaluated by galvanostatic charge/discharge cycling at a current density of 50-500 mA/g using an Arbin electrochemical workstation. Testing results indicate that the batteries containing quasi-solid or solid-state electrolytes obtained by in situ curing perform very well, having higher energy densities and power densities as compared to battery modules having conventional liquid electrolyte-based lithium cells connected in series via wires. These bipolar batteries are flame resistant and relatively safe.

Example 8: In Situ Cured Diethyl Vinylphosphonate and Diisopropyl Vinylphosphonate Polymer Electrolytes in a Bipolar Lithium/NCM-532 Battery (Initially the Cell being Lithium-Free) and a Bipolar Lithium-Ion Battery Containing a Si-Based Anode and an NCM-532 Cathode Both diethyl vinylphosphonate and diisopropyl vinylphosphonate can be polymerized by a peroxide initiator (di-tert-butyl peroxide), along with LiBF$_4$, to clear, light-yellow polymers of low molecular weight. In a typical procedure, either 85% by weight of diethyl vinylphosphonate or diisopropyl vinylphosphonate (being a liquid at room temperature) and 5% of a second liquid solvent (unsaturated phosphazene) were added with di-tert-butyl peroxide (1% by weight) and LiBF$_4$ (9% by weight) to form a reactive electrolyte solution. The electrolyte solution was heated to 45° C. and mixed with anode active material particles (graphene-coated Si particle) and acetylene black particles to form an anode layer that is deposited on one primary surface of a current collector (for a lithium-ion battery). A layer of cathode active material (NCM-522 particles) was made in a similar manner and coated onto the other primary surface of the same bipolar current collector. For the construction of an anode-less lithium metal battery, the anode side of the bipolar current collector was left open (without any anode active material).

Layers of diethyl vinylphosphonate and diisopropyl vinylphosphonate polymer electrolytes were cast on glass surfaces and polymerized for 3 hours. The lithium ion conductivity of these solid-state electrolytes was measured. The lithium ion conductivity of diethyl vinylphosphonate derived polymers was found to be in the range from $5.4 \times 10^{-5}$ S/cm-$7.3 \times 10^{-4}$ S/cm and that of diisopropyl vinylphosphonate polymer electrolytes in the range from $6.6 \times 10^{-5}$ S/cm-$8.4 \times 10^{-4}$ S/cm without a second solvent. Both are solid state electrolytes that are highly flame resistant. The presence of phosphazene liquid was found to increase the lithium ion conductivity by 3-5 times.

Multiple bipolar electrodes and layers of polymer electrolyte separator were stacked to form bipolar batteries. Bulk polymerization was allowed to proceed for 2-12 hours inside a battery. In several samples, a garnet-type solid electrolyte (Li$_7$La$_3$Zr$_2$O$_{12}$ (LLZO) powder) was added into the cathode (NCM-532) in the anode-less lithium battery.

Example 9: Solid State Electrolytes Via In Situ Curing of Cyclic Esters of Phosphoric Acid As selected examples of polymers from phosphates, five-membered cyclic esters of phosphoric acid of the general formula: —CH$_2$CH(R)OP(O)—(OR')O— were polymerized to solid, soluble polymers of high molecular weight by using n-C$_4$H$_9$Li, (C$_5$H$_5$)$_2$Mg, or (i-C$_4$H$_9$)$_3$Al as initiators. The resulting polymers have a repeating unit as follows:

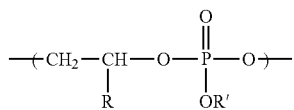

where R is H, with R'=CH$_3$, C$_2$H$_5$, n-C$_3$H$_7$, i-C$_3$H$_7$; n-C$_4$H$_9$, CCl$_3$CH$_2$, or C$_6$H$_5$, or R is CH$_2$Cl and R' is C$_2$H$_5$. The polymers typically have M$_n$=10$^4$-10$^5$.

In a representative procedure, initiators n-C$_4$H$_9$Li (0.5% by weight) and 5% lithium bis(oxalato)borate (LiBOB) as a lithium salt were mixed with 2-alkoxy-2-oxo-1,3,2-dioxaphospholan (R'=H in the following chemical formula):

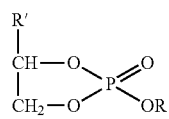

A second solvent, DMMP, having the following structure, was used to adjust the viscosity of the reactant mixture:

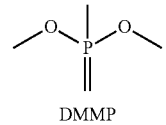

DMMP

The mixture was introduced into bipolar electrodes and the anionic polymerization was allowed to proceed at room temperature (or lower) overnight to produce a solid state electrolyte in situ. The room temperature lithium ion conductivities of this series of solid electrolytes are in the range from $2.5 \times 10^{-5}$ S/cm-$1.6 \times 10^{-3}$ S/cm. Layers of these polymer solid electrolytes were incorporated into a bipolar battery as separators.

Both Li metal bipolar batteries (containing a lithium foil as an anode material) and Li-ion batteries (containing artificial graphite particles as an anode active material) were prepared. Both batteries comprise NCA particles as the cathode active material.

The invention claimed is:

1. A bipolar electrode for a lithium battery, wherein said bipolar electrode comprises:
    a) A current collector comprising a conductive material foil having a thickness from 10 nm to 100 μm and two opposing primary surfaces, wherein one or both of the primary surfaces is coated with a layer of graphene or expanded graphite material having a thickness from 1 nm to 50 μm; and
    b) a negative electrode layer and a positive electrode layer respectively disposed on the two primary surfaces, each in physical contact with said layer of graphene or expanded graphite material or in direct contact with a primary surface of said conductive material foil, wherein the positive electrode layer comprises a mixture of particles of a cathode active material and a quasi-solid or solid-state electrolyte and the electrolyte comprises a polymer, which is a polymerization or crosslinking product of a reactive additive, wherein the reactive additive comprises (i) a first liquid solvent that is polymerizable, (ii) an initiator or curing agent, and (iii) a lithium salt, wherein the first liquid solvent occupies from 1% to 99% by weight of the total weight of the reactive additive.

2. The bipolar electrode of claim 1, wherein the first liquid solvent is selected from the group consisting of vinylene carbonate, ethylene carbonate, fluoroethylene carbonate, vinyl sulfite, vinyl ethylene sulfite, vinyl ethylene carbonate, 1,3-propyl sultone, 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, sulfones, sulfides, nitriles, sulfates, siloxanes, silanes, phosphates, phosphonates, phosphinates, phosphines, phosphine oxides, phosphonic acids, phosphorous acid, phosphites, phosphoric acids, phosphazene compounds, derivatives thereof, and combinations thereof.

3. The bipolar electrode of claim 1, wherein the negative electrode layer comprises a lithium metal layer or a layer of a mixture of particles of an anode active material and a quasi-solid or solid-state electrolyte and the electrolyte comprises a polymer, which is a polymerization or crosslinking product of a reactive additive, wherein the reactive additive comprises (i) a third liquid solvent that is polymerizable, (ii) an initiator or curing agent, and (iii) a lithium salt, wherein the third liquid solvent occupies from 1% to 99% by weight of the total weight of the reactive additive, wherein the third liquid solvent is the same as or different from the first liquid solvent.

4. The bipolar electrode of claim 1, wherein the electrolyte further comprises a second liquid solvent wherein the first liquid solvent has a lower flash point, a higher vapor pressure, a higher dielectric constant, or a higher solubility of the lithium salt as compared with the second liquid solvent.

5. The bipolar electrode of claim 4, wherein the first or the second liquid solvent comprises a flame retardant selected from an organic phosphorus compound, an inorganic phosphorus compound, a halogenated derivative thereof, or a combination thereof.

6. The bipolar electrode of claim 5, wherein the organic phosphorus compound or the inorganic phosphorus compound is selected from the group consisting of phosphates, phosphonates, phosphonic acids, phosphorous acids, phosphites, phosphoric acids, phosphinates, phosphines, phosphine oxides, phosphazene compounds, derivatives thereof, and combinations thereof.

7. The bipolar electrode of claim 4, wherein the first or the second liquid solvent is selected from a phosphate, phosphonate, phosphinate, phosphine, or phosphine oxide having the structure of:

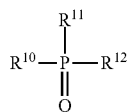

wherein $R^{10}$, $R^{11}$, and $R^{12}$, are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, and the second liquid solvent is stable under an applied electrical potential no less than 4 V.

8. The bipolar electrode of claim 4, wherein the first or second liquid solvent comprises a phosphoranimine having the structure of:

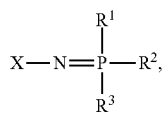

wherein $R^1$, $R^2$, and $R^3$ are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, wherein $R^1$, $R^2$, and $R^3$ are represented by at least two different substituents and wherein X is selected from the group consisting of an organosilyl group or a tert-butyl group.

9. The bipolar electrode of claim 8, wherein $R^1$, $R^2$, and $R^3$ are each independently selected from the group consisting of an alkoxy group, and an aryloxy group.

10. The bipolar electrode of claim 1, wherein the lithium salt occupies 0.1%-30% by weight and the crosslinking agent and/or initiator occupies 0.1-50% by weight of the reactive additive.

11. The bipolar electrode of claim 1, wherein the electrolyte exhibits a vapor pressure less than 0.001 kPa when measured at 20° C., a vapor pressure less than 10% of the vapor pressure of the first liquid solvent and lithium salt combined alone without the polymerization, a flash point at least 100 degrees Celsius higher than a flash point of said first liquid solvent alone, a flash point higher than 200° C., or no measurable flash point and wherein the polymer has a lithium ion conductivity from $10^{-8}$ S/cm to $10^{-2}$ S/cm at room temperature.

12. The bipolar electrode of claim 4, wherein the second liquid solvent is not polymerized or is polymerized to a lesser extent as compared to the first liquid solvent.

13. The bipolar electrode of claim 4, wherein the second liquid solvent is selected from a fluorinated carbonate, hydrofluoroether, fluorinated ester, sulfone, nitrile, phosphate, phosphite, alkyl phosphonate, phosphazene, sulfate, siloxane, silane, 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, dimethyl carbonate (DMC), methylethyl carbonate (MEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene, methyl acetate (MA), fluoroethylene carbonate (FEC), allyl ethyl carbonate (AEC), or a combination thereof, wherein the second liquid solvent is different than the first liquid solvent.

14. The bipolar electrode of claim 1, wherein the first liquid solvent is selected from the group consisting of fluorinated vinyl carbonates, fluorinated vinyl monomers, fluorinated esters, fluorinated vinyl esters, and fluorinated vinyl ethers and combinations thereof.

15. The bipolar electrode of claim 4, wherein the second liquid solvent is selected from the group consisting of fluorinated vinyl carbonates, fluorinated vinyl monomers, fluorinated esters, fluorinated vinyl esters, and fluorinated vinyl ethers and combinations thereof.

16. The bipolar electrode of claim 4, wherein the first or the second liquid solvent comprises a sulfone or sulfide selected from vinyl sulfone, allyl sulfone, alkyl vinyl sulfone, aryl vinyl sulfone, vinyl sulfide, TrMS, MTrMS, TMS, EMS, MMES, EMES, EMEES, or a combination thereof:

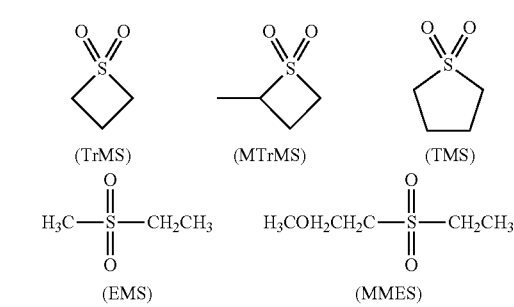

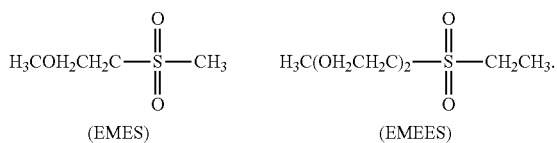

(EMES)   (EMEES)

17. The bipolar electrode of claim 16, wherein the vinyl sulfone or sulfide is selected from ethyl vinyl sulfide, allyl methyl sulfide, phenyl vinyl sulfide, phenyl vinyl sulfoxide, allyl phenyl sulfone, allyl methyl sulfone, divinyl sulfone, or a combination thereof, wherein the vinyl sulfone does not include methyl ethylene sulfone and ethyl vinyl sulfone.

18. The bipolar electrode of claim 1, wherein the first liquid solvent comprises a nitrile, a dinitrile selected from AND, GLN, or SEN, or a combination thereof:

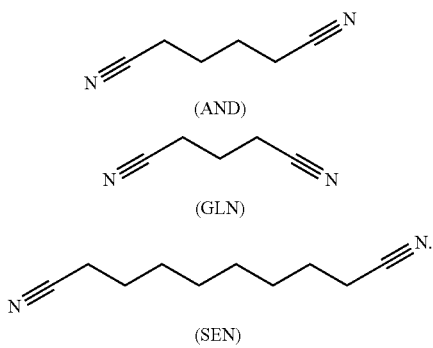

(AND)

(GLN)

(SEN)

19. The bipolar electrode of claim 4, wherein the first or the second liquid solvent comprises a phosphate selected from allyl-type, vinyl-type, styrenic-type and (meth)acrylic-type monomers bearing a phosphonate moiety.

20. The bipolar electrode of claim 4, wherein the first or the second liquid solvent comprises a phosphate, phosphonate, phosphonic acid, phosphazene, or phosphite selected from TMP, TEP, TTP, TDP, DPOF, DMMP, DMMEMP, tris(trimethylsilyl)phosphite (TTSPi), alkyl phosphate, triallyl phosphate (TAP), or a combination thereof, wherein TMP, TEP, TPP, TDP, DPOF, DMMP, DMMEMP, and phosphazene have the following chemical formulae:

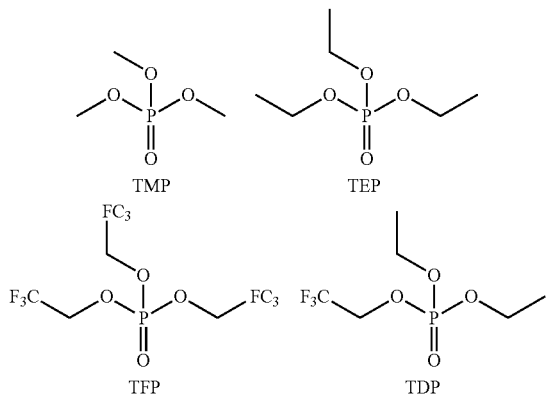

TMP   TEP

TFP   TDP

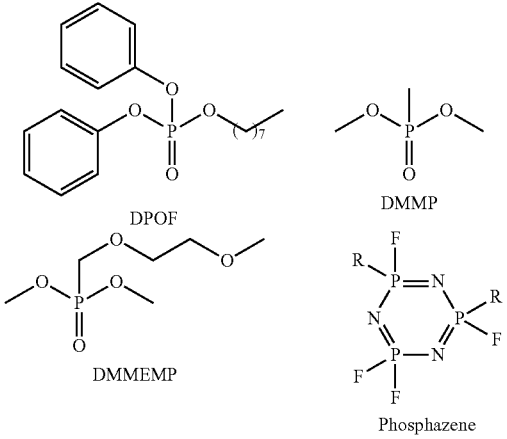

DPOF   DMMP

DMMEMP   Phosphazene wherein R=H, $NH_2$, or $C_1$-$C_6$ alkyl.

21. The bipolar electrode of claim 4, wherein the first or the second liquid solvent comprises siloxane or silane selected from alkylsiloxane (Si—O), alkyylsilane (Si—C), liquid oligomeric silaxane (—Si—O—Si—), or a combination thereof.

22. The bipolar electrode of claim 1, wherein the reactive additive further comprises an amide group selected from N,N-dimethylacetamide, N,N-diethylacetamide, N,N-dimethylformamide, N,N-diethylformamide, or a combination thereof.

23. The bipolar electrode of claim 1, wherein the cross-linking agent comprises a compound having at least one reactive group selected from a hydroxyl group, an amino group, an imino group, an amide group, an acrylic amide group, an amine group, an acrylic group, an acrylic ester group, or a mercapto group in the molecule.

24. The bipolar electrode of claim 1, wherein the cross-linking agent is selected from poly(diethanol) diacrylate, poly(ethyleneglycol)dimethacrylate, poly(diethanol) dimethylacrylate, poly(ethylene glycol) diacrylate, or a combination thereof.

25. The bipolar electrode of claim 1, wherein said initiator is selected from an azo compound, azobisisobutyronitrile, azobisisoheptonitrile, dimethyl azobisisobutyrate, benzoyl peroxide tert-butyl peroxide and methyl ethyl ketone peroxide, benzoyl peroxide (BPO), bis(4-tert-butylcyclohexyl) peroxydicarbonate, t-amyl peroxypivalate, 2,2'-azobis-(2,4-dimethylvaleronitrile), 2,2'-azobis-(2-methylbutyronitrile), 1,1-azobis(cyclohexane-1-carbonitrile, benzoylperoxide (BPO), hydrogen peroxide, dodecamoyl peroxide, isobutyryl peroxide, cumene hydroperoxide, tert-butyl peroxypivalate, diisopropyl peroxydicarbonate, lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), or a combination thereof.

26. The bipolar electrode of claim 1, wherein said lithium salt is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoromethanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate (LiNO$_3$), Li-fluoroalkyl-phosphates (LiPF$_3$(CF$_2$CF$_3$)$_3$), lithium bisperfluoro-ethylsulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

27. The bipolar electrode of claim 1, wherein the cathode comprises a cathode active material selected from lithium nickel manganese oxide (LiNi$_a$Mn$_{2-a}$O$_4$, 0<a<2), lithium nickel manganese cobalt oxide (LiNi$_n$Mn$_m$Co$_{1-n-m}$O$_2$, 0<n<1, 0<m<1, n+m<1), lithium nickel cobalt aluminum oxide (LiNi$_c$Co$_d$Al$_{1-c-d}$O$_2$, 0<c<1, 0<d<1, c+d<1), lithium manganese (LiMn$_2$O$_2$), lithium iron phosphate (LiFePO$_4$), lithium manganese oxide (LiMnO$_2$), lithium cobalt oxide (LiCoO$_2$), lithium nickel cobalt oxide (LiNi$_p$Co$_{1-p}$O$_2$, 0<p<1), or lithium nickel manganese oxide (LiNi$_q$Mn$_{2-q}$O$_4$, 0<q<2).

28. The bipolar electrode of claim 1, wherein the negative electrode layer comprises an anode active material selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobate, lithium-containing titanium oxide, lithium transition metal oxide, ZnCo$_2$O$_4$; (f) carbon or graphite particles (g) prelithiated versions thereof; and (h) combinations thereof.

29. A bipolar lithium battery comprising at least two bipolar electrodes as defined in claim 1, wherein the at least two bipolar electrodes are connected in series in such a manner that an ion-permeable separator is disposed between the negative electrode layer of a bipolar electrode and the positive electrode layer of a neighboring bipolar electrode.

30. The bipolar lithium battery of claim 29, wherein the separator comprises the quasi-solid or solid-state electrolyte.

31. A bipolar lithium battery comprising at least two bipolar electrodes as defined in claim 3, wherein the at least two bipolar electrodes are connected in series in such a manner that an ion-permeable separator is disposed between the negative electrode layer of a bipolar electrode and the positive electrode layer of a neighboring bipolar electrode.

32. The bipolar lithium battery of claim 29, which is a lithium metal secondary battery, a lithium-ion battery, a lithium-sulfur battery, a lithium-ion sulfur battery, a lithium-selenium battery, or a lithium-air battery.

* * * * *